United States Patent
Shimizu et al.

(10) Patent No.: US 6,964,019 B2
(45) Date of Patent: Nov. 8, 2005

(54) HYPERMEDIA DOCUMENT AUTHORING

(75) Inventors: Takeshi Shimizu, Palo Alto, CA (US); Stephen W. Smollar, Palo Alto, CA (US)

(73) Assignees: Xerox Corporation, Stamford, CT (US); Fuji Xerox Co., Ltd., Tokyo (JP)

( * ) Notice: Subject to any disclaimer, the term of this patent is extended or adjusted under 35 U.S.C. 154(b) by 14 days.

(21) Appl. No.: 09/974,055

(22) Filed: Oct. 11, 2001

(65) Prior Publication Data

US 2002/0054058 A1 May 9, 2002

Related U.S. Application Data

(63) Continuation of application No. 08/938,973, filed on Sep. 26, 1997.

(51) Int. Cl.[7] .............................................. G06F 15/00
(52) U.S. Cl. ....................................... 715/530; 715/500
(58) Field of Search .............................. 715/501.1, 530, 715/513, 500, 500.1, 515, 104.1; 707/501.1, 500.1, 515, 104.1

(56) References Cited

U.S. PATENT DOCUMENTS

| | | | | |
|---|---|---|---|---|
| 5,119,465 A | * | 6/1992 | Jack et al. ................... | 717/137 |
| 5,173,853 A | * | 12/1992 | Kelly et al. .................. | 707/513 |
| 5,220,657 A | | 6/1993 | Bly et al. .................... | 345/329 |
| 5,347,628 A | | 9/1994 | Brewer et al. ............... | 345/351 |
| 5,421,012 A | | 5/1995 | Khoyi et al. ................. | 709/107 |
| 5,446,891 A | | 8/1995 | Kaplan et al. ................. | 707/2 |
| 5,537,526 A | | 7/1996 | Anderson et al. ........... | 707/515 |

(Continued)

FOREIGN PATENT DOCUMENTS

EP 0-645-721 A1 3/1995

OTHER PUBLICATIONS

Candan et al., CHIMP: A Framework for Supporting Distributed Multimedia Document Authoring and Presentation, ACM 1996, pp. 329–340.*

(Continued)

*Primary Examiner*—Cong-Lac Huynh
(74) *Attorney, Agent, or Firm*—Oliff & Berridge PLC

(57) ABSTRACT

A hypermedia authoring system enables an author to generate a document using a goals outline and a presentation outline. The goals outline is generated by instantiating document prototypes. A display of the goals outline permits the author to select a prototype document from a directory of prototype documents and instantiate the selected prototype document that corresponds to a node of the goals outline. The instantiated document prototype is linked to cards in a card database. The presentation outline is displayed as Bento-boxes. Each Bento-box includes spacer objects which are defined spatially and temporally. The spacer objects may be linked to cards. The goals outline is related to the presentation outline based on commonly linked cards. The Bento-boxes may be linked to each other in a stack or hyperlinked to other Bento-boxes via anchors. A display of all the Bento-boxes of a hypermedia document shows a linkage path established by the hyperlinks between Bento-boxes/Bento-box stacks. If both the presentation outline and the goals outline are displayed, selecting a Bento-box or a node of the goals outline causes related nodes or Bento-boxes, respectively, to be highlighted. If a complete goals/presentation outline is selected, the highlighting shows a measure of completeness between the presentation outline and the goals outline. A navigation facility is also provided such as a kitchen, an office or a studio.

18 Claims, 21 Drawing Sheets

U.S. PATENT DOCUMENTS

| | | | | |
|---|---|---|---|---|
| 5,617,565 | A | 4/1997 | Augenbraun et al. | 707/501 |
| 5,655,130 | A | 8/1997 | Dodge et al. | 707/511 |
| 5,682,469 | A | 10/1997 | Linnett et al. | 345/473 |
| 5,694,610 | A | 12/1997 | Habib et al. | 707/531 |
| 5,708,845 | A | 1/1998 | Wistendahl et al. | 345/302 |
| 5,717,922 | A | 2/1998 | Hohensee et al. | 707/100 |
| 5,717,945 | A | 2/1998 | Tamura | 707/530 |
| 5,761,684 | A | 6/1998 | Gibson | 707/515 |
| 5,900,870 | A | 5/1999 | Malone et al. | 345/333 |
| 5,903,905 | A * | 5/1999 | Andersen et al. | 715/526 |
| 5,933,841 | A | 8/1999 | Schumacher et al. | 707/501 |
| 5,956,736 | A | 9/1999 | Hanson et al. | 707/517 |
| 5,963,208 | A | 10/1999 | Dolan et al. | 345/357 |
| 5,970,505 | A * | 10/1999 | Ebrahim | 715/501.1 |
| 5,978,818 | A | 11/1999 | Lie | 707/501 |
| 5,983,227 | A | 11/1999 | Nazem et al. | 707/10 |
| 5,999,664 | A * | 12/1999 | Mahoney et al. | 382/180 |
| 6,023,715 | A | 2/2000 | Burkes et al. | 707/514 |
| 6,026,417 | A * | 2/2000 | Ross et al. | 715/517 |
| 6,029,182 | A | 2/2000 | Nehab et al. | 707/523 |
| 6,055,522 | A | 4/2000 | Krishna et al. | 705/517 |
| 6,065,026 | A | 5/2000 | Cornelia et al. | 707/531 |
| 6,088,032 | A | 7/2000 | Mackinlay | 345/335 |
| 6,177,933 | B1 * | 1/2001 | Young | 345/776 |
| 6,243,722 | B1 * | 6/2001 | Day et al. | 715/512 |
| 6,247,011 | B1 * | 6/2001 | Jecha et al. | 707/9 |
| 6,311,196 | B1 * | 10/2001 | Arora et al. | 715/513 |
| 6,321,244 | B1 * | 11/2001 | Liu et al. | 707/500 |

OTHER PUBLICATIONS

Baecker et al., A Multimedia System for Authoring Motion Pictures, ACM 1996, pp. 31–42.*

DeStefano, Make Visual Basic Talk to Word, Test & Measurement World, Mar. 1997, vol. 17, iss. 4, p. 48, 4 pgs.*

Boyce et al., Using Microsoft Office 97 Professional, Que Corporation Oct. 1997, pp. 489–516.*

Falcigno et al., Home page, sweet home page: Creating a Web presence, Database, Apr. 1995, vol. 18, iss. 2, p. 20, 7 pgs.*

Gerler, Microsoft PowerPoint 97, Que Corporation 1996, pp. 9–12, 32–34, 84, 151–154m 161–166.*

Stanek, Microsoft FrontPage Unleashed, Macmillan Computer Publishing, Sep. 6, 1996, chapters 19 & 22.*

Tyler, Microsoft FrontPage 97, Sams.net Publishing Jan. 17, 1997, pp. 3–29.*

"A Cognitive Basis for A Computer Writing Environment". TR87–032, The University of North Carolina at Chapel Hill Department of Computer Science, John B Smith et al., Jun. 1988, pp. 1–22.

"Multimedia Document System for Temporal and Spatial Structuring", Takeshi Shimizu et al., Fuji Xerox Palo Alto Lab, Fuji Xerox Co., Ltd., Workshop Presentation, Montpelier, 1995.

"Coming to Terms—The Rhetoric of Narrative in Fiction and Film", Seymour Chatman, Cornell University Press, 1990, pp. 1–21.

"Note Cards in a Nutshell", Frank G. Halasz et al., Intelligent Systems Laboratory, Xerox Palo Alto Research Center, 1987, pp. 45–52.

"Hypermedia Templates: An Author's Tool", Karen Smith Catlin et al., Institute for Research in Information and Scholarship, Brown University, Dec. 1991, pp. 147–160.

"SEPIA: A Cooperative Hypermedia Authoring Environment", Roy Rada, School of Electrical Engineering and Computer Science, Washington State University, 1996, pp. 241–264.

"Generating Hypermedia from Specifications by Sketching Multimedia Templates", S. Fraisse et al., ACM Multimedia, 1996, pp. 353–363.

Structured Multimedia Authoring:, Lynda Hardman et al., Multimedia Proceedings, Jun. 1993, pp. 283–289.

"Multimedia Document System for Temporal and Spatial Structuring", Takeshi. Schimizu, Osamu Nakamura, Yasushi Kiyoki, Jun. 1995.

"The Instructional Design Environment", Xerox Palo Alto Research Center, Jul. 1990, Daniel M. Russell.

Text Types in Hypermedia, Stephen Smoliar et al., Fuji Xerox Palo Alto Laboratory, Inc., Jan. 1997.

The Complete Works of Aristotle, vol. 2, Princeton University Press, edited by Jonathan Barnes, 1984.

"The Instructional Design Environment: technology to support design problem solving ", Peter Pirolli et al., Instructional Science, vol. 19, pp 121–144, 1990.

"Hypertext: An Introduction and Survey", Jeff Conklin, Survey and Tutorial Series, Sep. 1987, vol. 20, No. 9, pp. 17–41.

"Image Databases and Multi–Media Search", A.W.M. Smeulders et al., Proceedings of the First International Workshop, IDB–MMS '96, Aug. 1996.

"The Uses of Argument", Stephen Toulmin, Cambridge University Press, 1958, pp. 92–145.

"The Role of the Reader", Umberto Eco, Indiana University Press, 1984, pp. 3–41.

"Strategies of Discourse Comprehension", Teun Dijk, Academic Press, Inc., 1983, pp. 1–60 and 387–403.

"Story and Discourse", Seymour Chatman, Cornell University Press, 1978, pp. 16–42.

"The 'HyTime" Hypermedia/Time–based Document Structuring Language, S. R. Newcomb et al., Communications of the ACM, vol. 34, No. 11, pp. 67–83, Nov. 1991.

"An Instructional Design Environment for Cognitive Tasks involving Software Use", David M. Russell, and Peter Pirolli, Annual Meeting of the American Educational Research Association, 1992.

"AESOP: An Outline–Oriented Authoring System", Takeshi Shimizu et al., Proceeding of The Thirty First Hawaii International Conference on System Sciences, vol. 2, Jan. 6–9, 1998, pp. 207–215.

"A Conceptual Modeling Approach to Authoring–in–the–Large for Hypertext Documents", Rick Sobiesiak et al., Conference on Organizational Computing Systems, Nov. 5–8, 1991, pp. 225–239.

* cited by examiner

FIG. 8

HYPERMEDIA DOCUMENT AUTHORING

This is a Continuation of application Ser. No. 08/938,973 filed Sep. 26, 1997.

BACKGROUND OF THE INVENTION

1. Field of Invention

The present invention relates to a hypermedia authoring system.

2. Description of Related Art

Authoring systems are based on cognitive models for how writing takes place. For example, University of North Carolina's Writing Environment provides four workspaces called the network mode, the tree mode, the editor mode and the text mode. Smith, J. B., and Lansman, M., *A Cognitive Basis for a Computer Writing Environment*, TR 87-032, Department of Computer Science, University of North Carolina at Chapel Hill (June 1988). The Writing Environment is based on a cognitive model that reflects the need to organize resources before writing and to structure outlines according to both logical and presentational criteria.

Other authoring systems that provide a variety of similar features are summarized as follows: SEPIA is a hypermedia authoring system that has four workspaces: 1) content space, 2) rhetorical space, 3) planning space, and 4) argumentation space. Streitz, N., et al., "SEPIA: A Cooperative Hypermedia Authoring Environment", In R. Rada (ed.), Groupware and Authoring, Academic Press, London 1996, pp. 241–264. Finally, CMIF provides: 1) a Hierarchy view to edit the hierarchy of a hypermedia document; and 2) a Channel view to specify synchronization among the components. Hardman, L., van Rossum, G., and Bulterman, D. C. A., "Structured Multimedia Authoring", ACM Multimedia 93 Proceedings (August 1993), pp. 283–289.

However, none of the above authoring schemes support an explicit representation of relationships between the logical and presentational organizations of the document being authored. In addition, current techniques do not provide sufficient support for navigating through the information represented by the workspaces.

SUMMARY OF THE INVENTION

The invention provides a hypermedia authoring system that enables an author to generate a document using a goals outline and a presentation outline and provides a technique to relate the goals and the presentation outlines. The goals outline organizes the information content of the document contained in cards in a logical structure while the presentation outline is directed to a physical appearance of the document.

The goals outline is generated by instantiating document prototypes that contain slots which indicate a type of information that is to be included in the document prototype. Each of the slot types may be linked to the cards by links which may be mandatory, optional or user defined. A visual display of the goals outline permits the author to select a prototype document from a directory of prototype documents and instantiate the selected prototype document that corresponds to a node of the goals outline.

Once instantiated, the hypermedia authoring system provides a display that permits the author to link each of the slot types of an instantiated document prototype with cards in a card database. Cards may also be created from scratch by the author or imported from external sources and linked with the instantiated document prototype.

The hypermedia authoring system also provides a display for creating a presentation outline in the form of Bento-boxes. Each Bento-box includes a layout workspace in which spacer objects may be placed. Spatial and temporal parameters may also be specified corresponding to each spacer object. The spacer objects may be linked to cards in the card database and an indication of a link relationship with the goals outline is also provided. When a spacer object is linked to a card that is also linked to a node in the goals outline, the Bento-box indicates such a goals outline relationship. Thus, while constructing a presentation outline, the author is also informed of the portions of the goals outline that is addressed and vice versa.

The Bento-boxes may be linked to each other in a stack for a sequential slide presentation, for example. In addition, the Bento-boxes may be hyperlinked to other Bento-boxes where anchors for the hyperlink may be within any of the spacer objects. Thus, a display of all the Bento-boxes of a hypermedia document including the linkages among the Bento-boxes would show a linkage path established by the hyperlinks between Bento-boxes.

In a display of the presentation outline and the linkage paths, one of the Bento-boxes or a Bento-box stack may be selected to show specifically the links to and from the selected Bento-box. In addition, the presentation outline and the goals outline may be simultaneously displayed showing the relationship between the presentation outline and the goals outline.

For example, if both the presentation outline and the goals outline are displayed and a Bento-box is selected in the presentation outline, corresponding nodes in the goals outline are highlighted to indicate the link between the presentation outline and the goals outline based on the cards that are linked to both of the outlines. The highlighting of the selected Bento-boxes and the corresponding nodes of the goals outline may be color coded to indicate a measure of overlap in terms of the number of cards that are common between the selected Bento-box and the highlighted nodes of the goals outline. The selection of a node in the goals outline results in similar highlighting of related Bento-boxes.

If a complete presentation outline is selected, the highlighting shows a measure of coverage between the presentation outline and the goals outline. That is, by selecting either the complete presentation outline or the complete goals outline, an indication of coverage in terms of the number of cards linked to both the goals and the presentation outlines as compared to the number of cards that are linked only to each of the goals or presentation outlines.

The hypermedia authoring system also provides a navigation facility based on visual metaphors familiar to the author. For example, a kitchen metaphor may be used where card databases are maintained either in cabinets or the freezer compartment of a refrigerator and the cutting board corresponds to a display of the presentation outline. Similar metaphors may be constructed using other familiar scenes such as an office or a studio.

BRIEF DESCRIPTION OF THE DRAWINGS

The invention is described with reference to the following drawings wherein like numerals represent like elements, and wherein:

FIG. 8 illustrates a display for the goals outline;

DETAILED DESCRIPTION OF PREFERRED EMBODIMENTS

Figure 1:
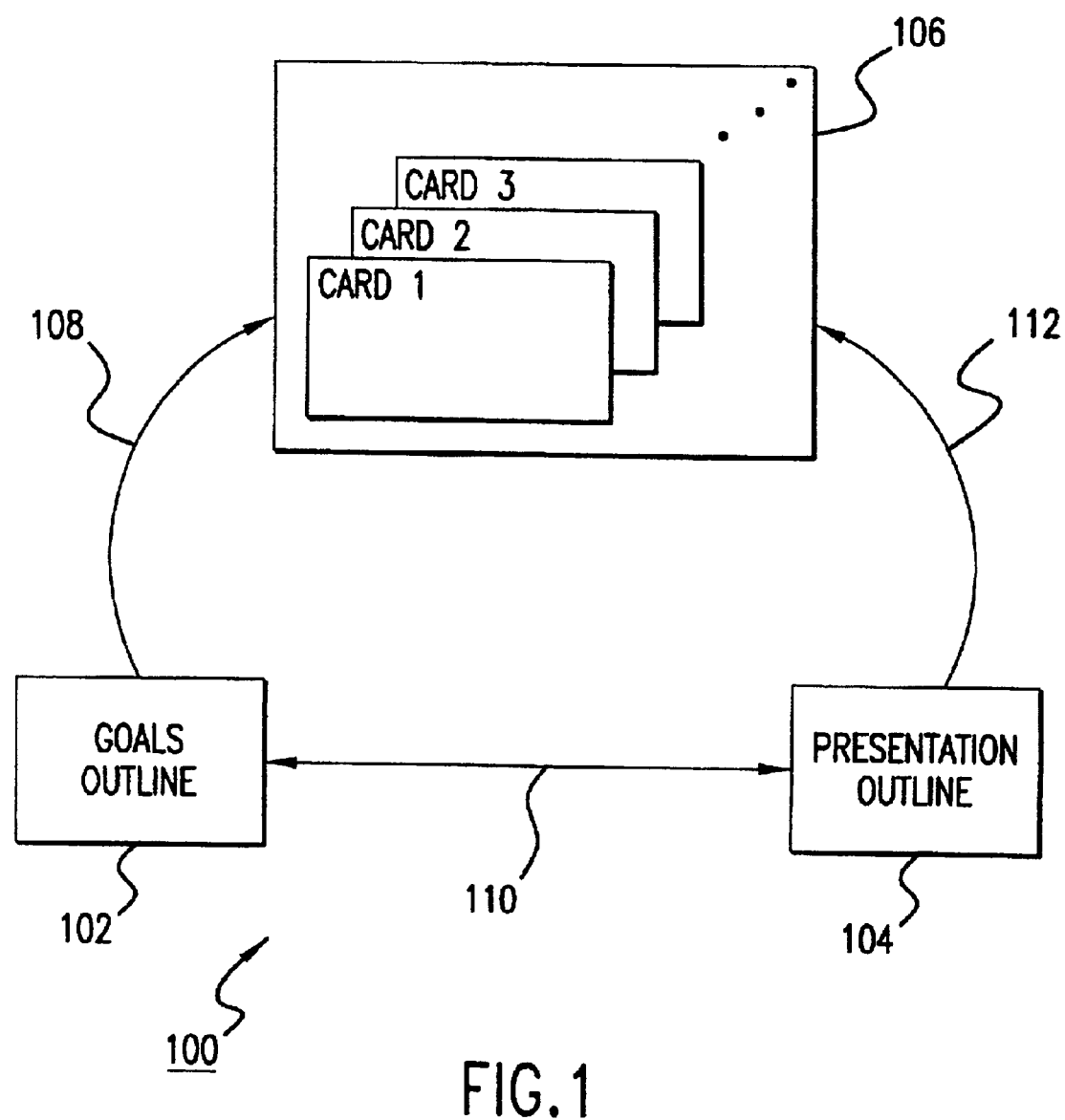
FIG. 1 is a diagram illustrating a relationship among a goals outline, a presentation outline, and a card database.

FIG. 1 shows a hypermedia authoring system 100 that includes a goals outline 102, a presentation outline 104 and a card database 106. Links 110 are established between the goals outline 102 and the presentation outline 104 and each of the goals outline 102 and the presentation outline 104 are linked to the card database 106 through links 108 and 112, respectively.

The cards in the card database 106 are information elements (called points) on which the document being authored is based. That is, the cards contain the actual hypermedia information such as video, sound or text that make up the document. The contents of the points may be appropriated from either external sources or created from scratch by the author.

Figure 2:
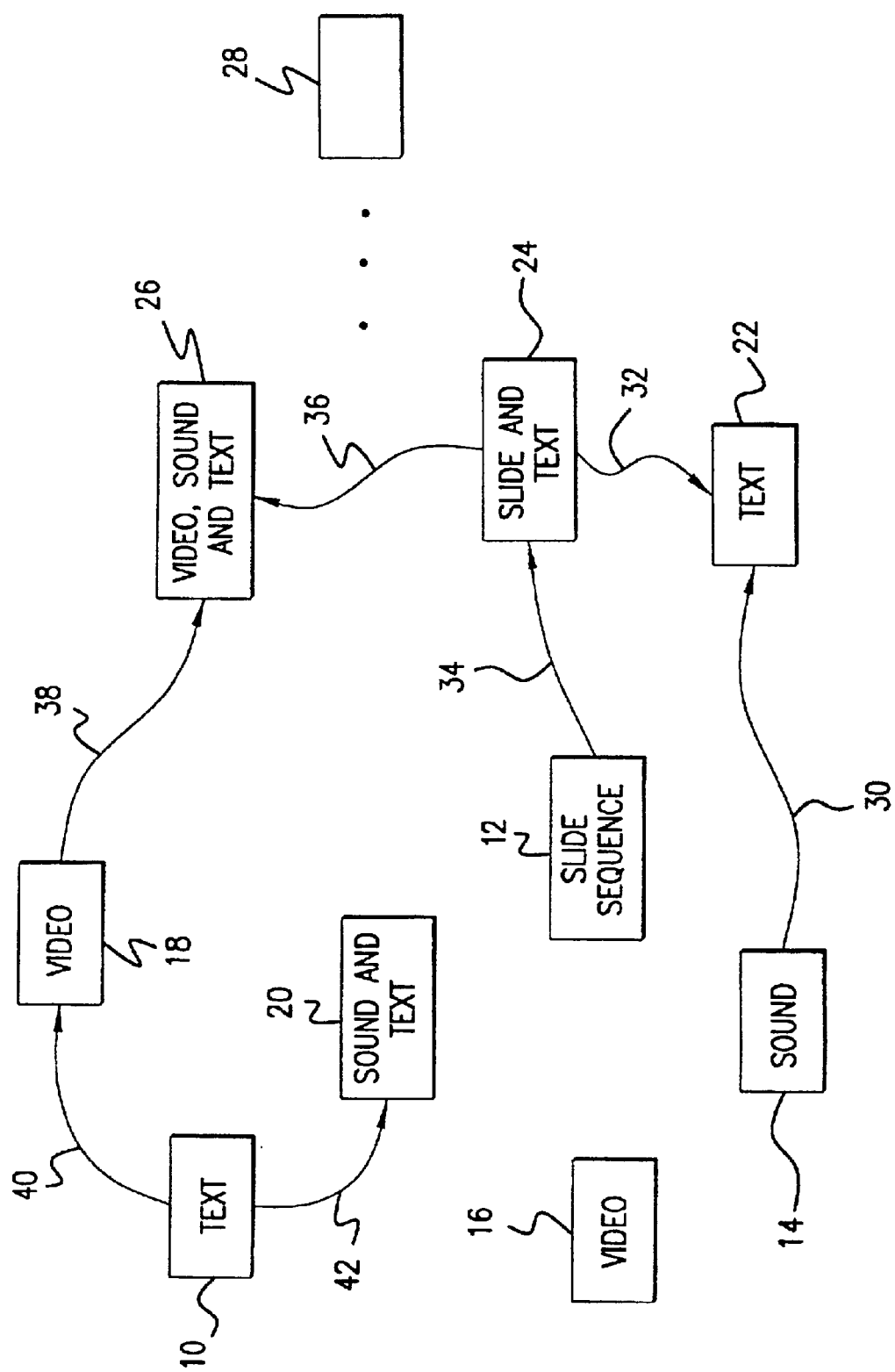
FIG. 2 is a diagram illustrating card linkages.

FIG. 2 shows an example set of cards 10–28 in the card database 106. As indicated by the arrows 30–42, the cards 10–28 may be interconnected or "linked". These links may be established as hyperlinks from a source card to an anchor point in the destination card. For example, text card 10 is hyperlinked to video card 18 and to sound and text card 20 via links 40 and 42, respectively. The anchors for the links 40 and 42 to cards 18 and 20 are global anchors because the links 40 and 42 links from card 10 to all the information contained in cards 18 and 20 (i.e., linked to the beginning of cards 18 and 20). In contrast, link 38 links card 18 to a specific point within card 26. Thus, the anchor point for link 38 in card 26 is a local anchor.

Local anchors may also be placed in source cards such as shown by link 34 between cards 12 and 24. Local anchors may be used as both source and destination points such as link 30 between cards 14 and 22. All the links 30–42 among the cards 10–28 establish a relationship network. This relationship among the cards 10–28 is established in connection with the presentation outline 104 described later.

Figure 3:
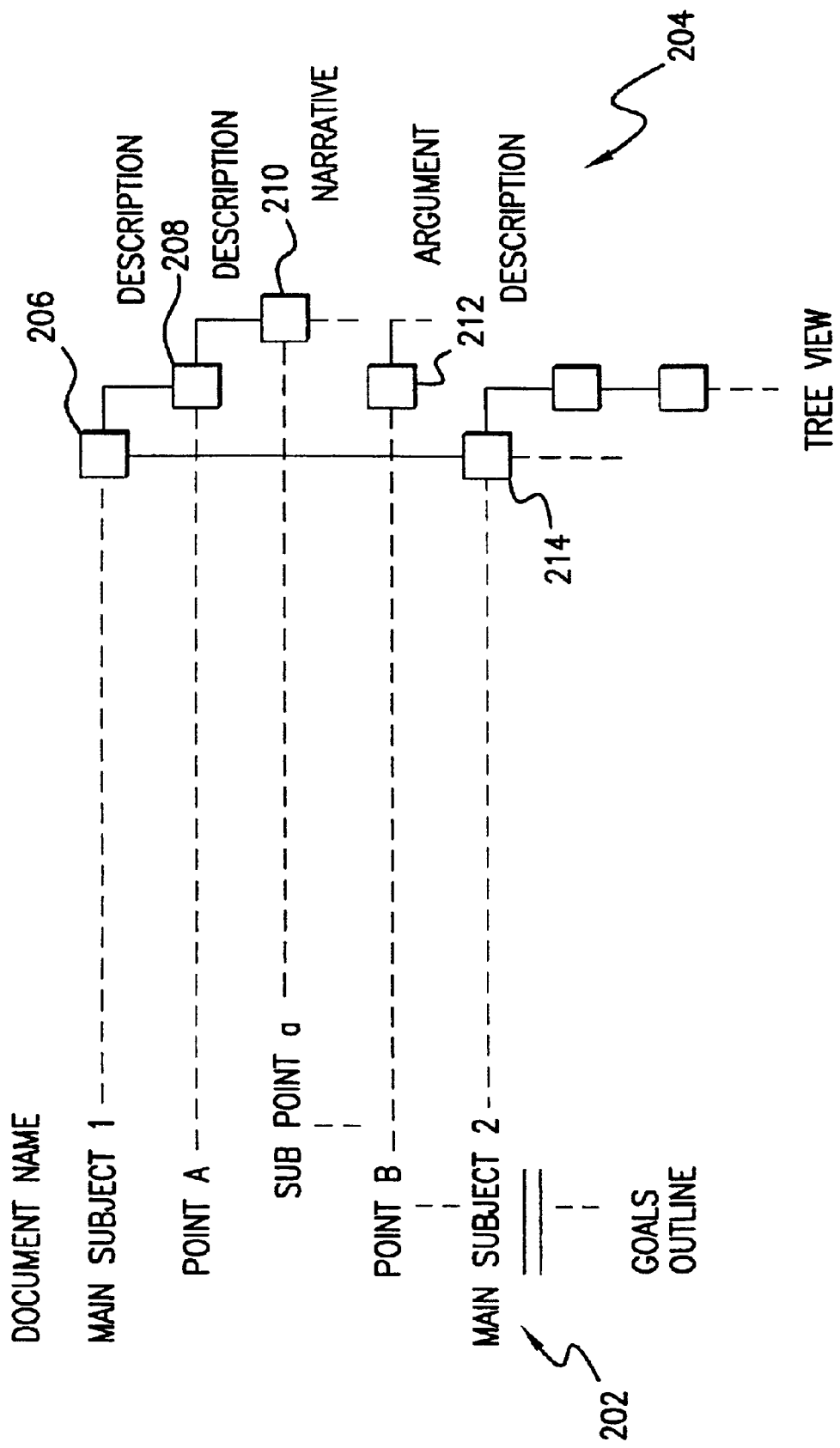
FIG. 3 is a diagram illustrating a tree view of the goals outline.

FIG. 3 shows an example of a goals outline 202. The goals outline may contain a document name and an organization of subject matter of the document to be authored in a logical structure. The goals outline 202 contains outline elements such as Main Subject 1 and Main Subject 2. Outline elements Point A and Point B are logically structured under Main Subject 1 and outline element Subpoint a is logically structured under Point A. As indicated on the right side of FIG. 3, the outline elements may be visualized in a tree view such as tree view 204. The tree view 204 includes nodes 206–214 which corresponds to the outline elements in the goals outline 202.

A type is associated with each of the nodes 206–214. For example, description type is associated with nodes 206, 208 and 214, while a narrative type is associated with node 210 and an argument type is associated with node 212. Each of these types indicates the information that is included in the particular portion of the goals outline. To assist the authoring process, templates or document prototypes are provided so that the author may easily "fill in" the required information corresponding to each of the types.

A hypermedia document may be authored in the hypermedia authoring system 100 by working with the goals outline or the presentation outline in any order or sequence. If the author prefers to first layout the logical structure of the document and then focus on the document's physical appearance, then the author completes the goals outline first and then the presentation outline. If the physical appearance of the document is to be addressed first, then the presentation outline may be completed before the goals outline. In fact, during the course of document authoring, a process of bouncing back and forth between the goals outline and the presentation outline may be most desirable.

Figure 4:
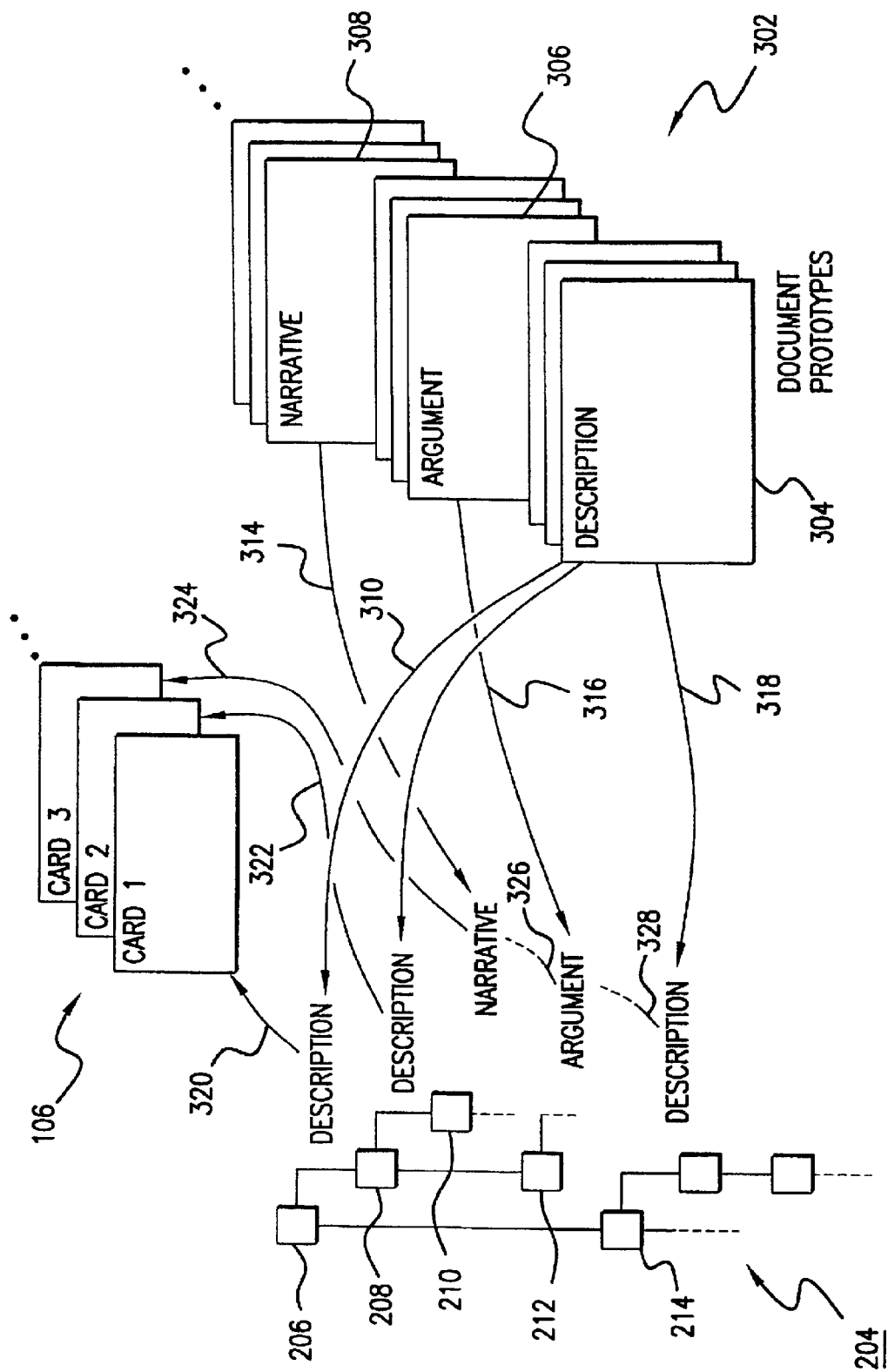
FIG. 4 is a diagram illustrating the instantiation of document prototypes and their links to cards.

FIG. 4 shows a process for generating the goals outline 202 by instantiating document prototypes and linking the instantiated document prototypes with the cards in the cards database 106. On the right side of FIG. 4, document prototypes 302 are shown for each of the above types: description 304, argument 306 and narrative 308 and other types may also be added. The types shown in FIG. 4 are examples. There may be multiple kinds of document prototypes for each type of description 304, argument 306, and narrative 308. Some of these prototypes may be constructed by the author as the authoring process progresses while others may be default prototypes provided to the author at the outset.

As an example, the goals outline 202 may be constructed as follows: The author selects from the description document prototype 304 and instantiates the selected prototypes to correspond to nodes 206, 208 and 214 of the tree view 204. One of the narrative document prototypes 308 is instantiated corresponding to node 210 and an argument document prototype 306 is instantiated corresponding to node 212.

Once instantiated, the author may personalize each of the instantiated prototypes by linking the prototypes to the respective cards in the card database 106. For example, the instantiated description document prototype 304 corresponding to node 206 may be linked to card 1 via link 320 while the description document prototype 304 corresponding to node 208 may be linked to card 2 by link 322 and the narrative document prototype 308 corresponding to node 210 is linked to card 3 by link 324. The argument document prototype corresponding to node 212 and the description document prototype corresponding to node 214 are similarly linked by links 326 and 328 to other cards in the card database.

Figure 5:
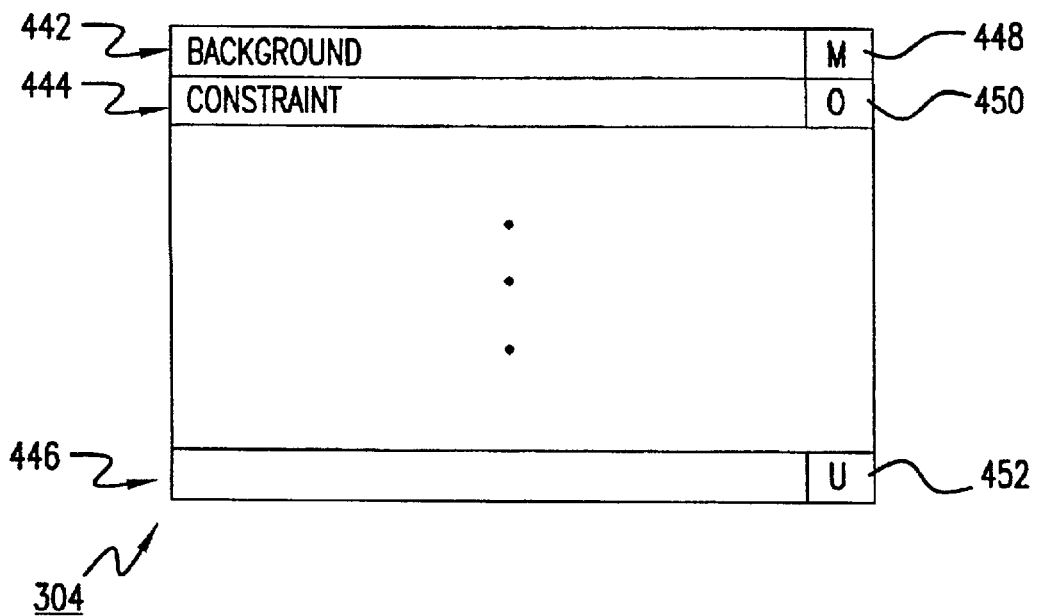
FIG. 5 illustrates an example of the document prototype.

FIG. 5 shows a possible structure for a description document prototype 304. The description document prototype 304 may include a predetermined set of subject matter or slot type 442, 444 and 446 that correspond to the description document prototype 304. For example, slot type 442 indicates that Background information should be included and slot type 444 indicates that Constraint information should be included. Each of the slot types 442–446 may be linked to a card in the database 106. The link to a card may be classified by link types such as: mandatory (M), optional (O), and user defined (U). As indicated in FIG. 5, the Background slot type 442 is mandatory as indicated by M 448 and the constraint slot type 444 is optional as indicated by O 450 while the slot type 446 is user defined as indicated by U 452.

Figure 6:
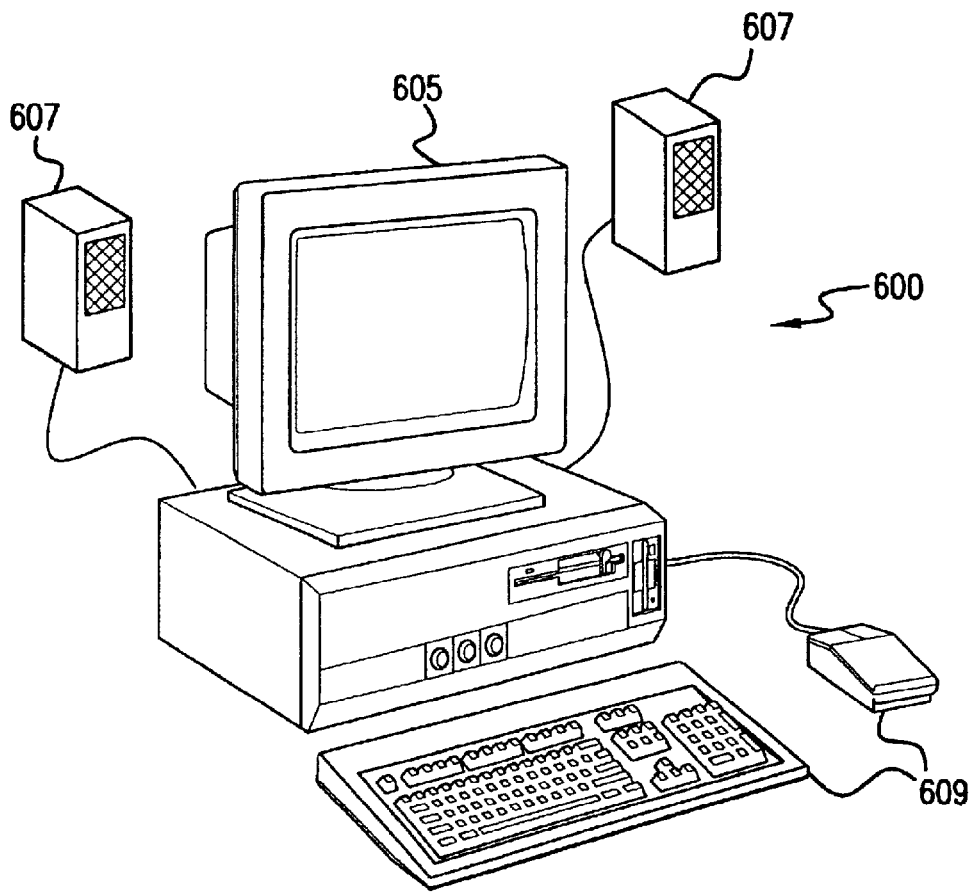
FIG. 6 illustrates an example of a terminal used for document authoring.

The document authoring system 100 provides a display to assist the creation of a goals outline for a document. As shown in FIG. 6, a terminal 600 may be used by the hypermedia authoring system 100 to receive inputs from the user through user input devices such as a keyboard/mouse 609 and outputs information to the user through the display 605 and speakers 607.

Figure 7:
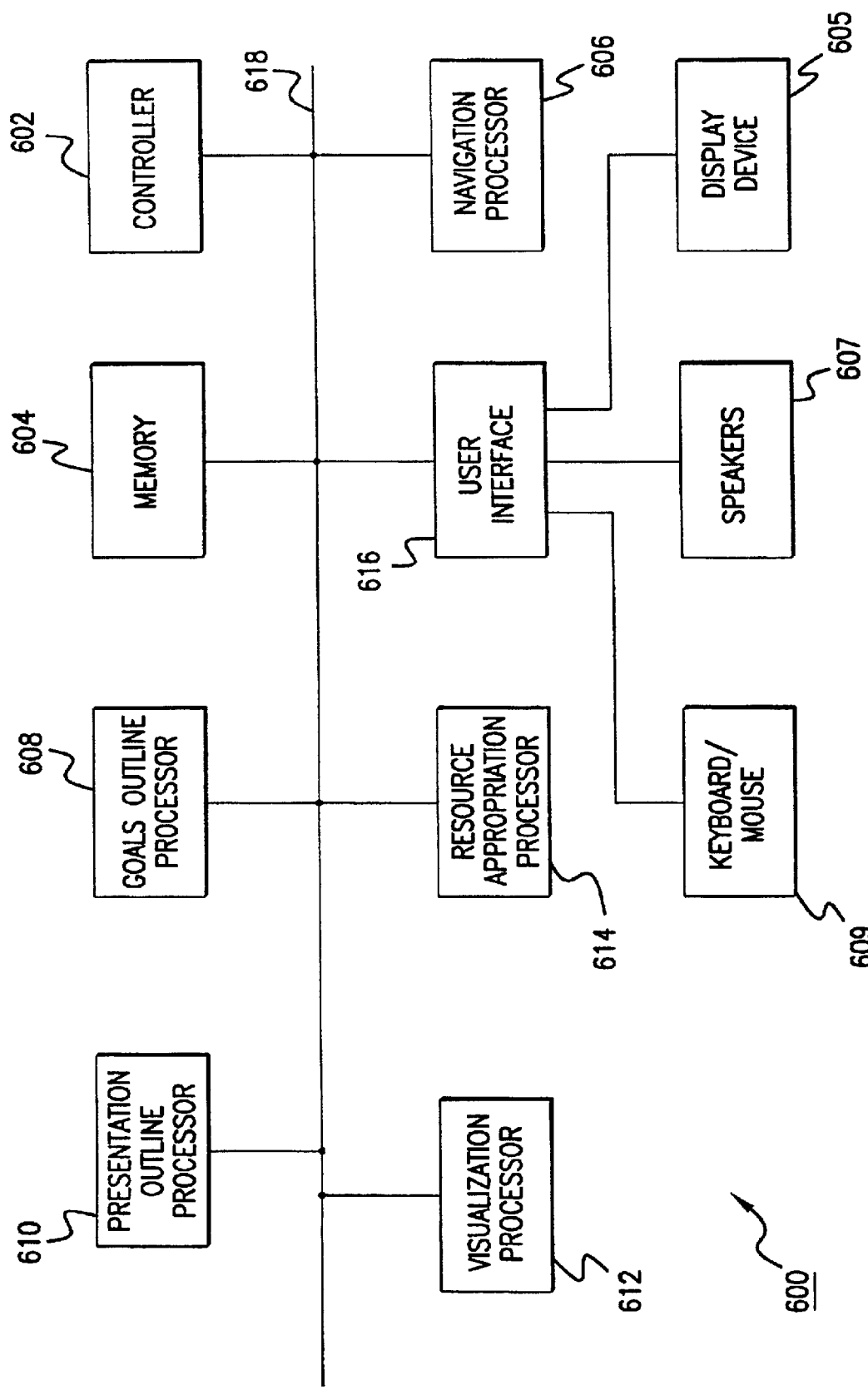
FIG. 7 is a block diagram of the terminal of FIG. 6.

FIG. 7 shows a block diagram of the terminal 600 that includes a controller 602, a memory 604, and a user interface 616 that interfaces with the keyboard mouse 609, the speakers 607 and the display device 605. The terminal 600 may also include dedicated processors for performing the functions of the hypermedia authoring system 100 such as the goals outline processes discussed above. The terminal 600 includes a goals outline processor 608, presentation outline processor 610, visualization processor 612, resource appropriation processor 614 and a navigation processor 606. These processes 606–614 perform the hypermedia authoring system functions. All the components of the terminal 600 are coupled together via signal bus 618.

The controller 602 may perform the functions of all the processors 606–614. The controller 602 may also include a hypermedia engine to perform linking processes required to support the hypermedia authoring system 100. In the following discussion, the controller 602 is assumed to be separate from the processors 606–614 and performs tasks required to support the processors 606–614. The hypermedia engine functions may be incorporated in any of the processors 606–614 as required.

Figure 8:
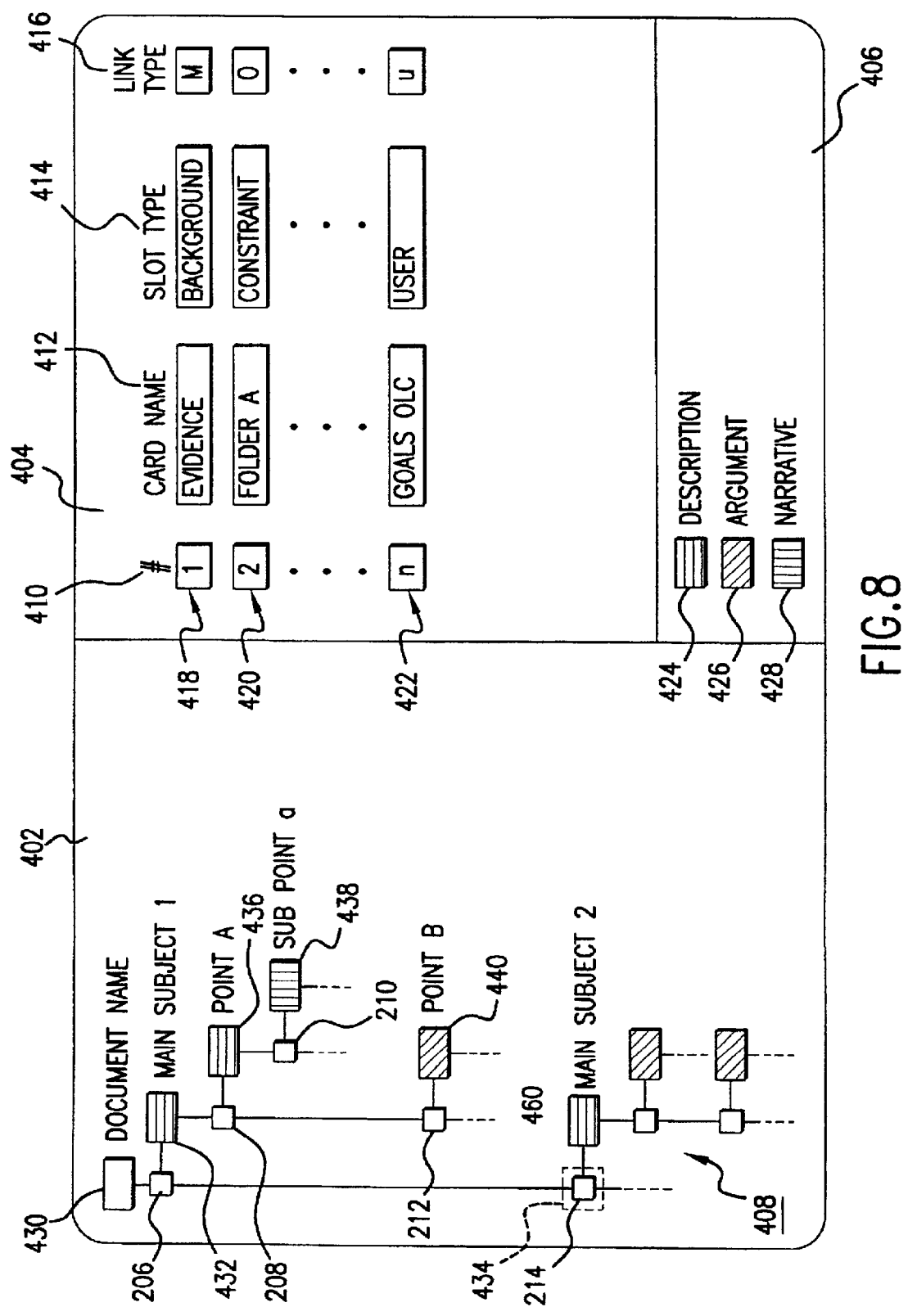

The goals outline processor 608 processes the goals outline by displaying a goals outline display 400 on the display device 605 and generates the goals outline 102 based on user inputs received through the keyboard/mouse 609, for example. FIG. 8 shows the goals outline display 400 that includes a tree view area 402, a card link area 404, and a document prototype legend area 406. The tree view area 402 displays the tree view 408 of the goals outline 202. Each of the nodes 206–214 are represented by square boxes that are connected to a respective icon such as icon 432 corresponding to node 206. Each of the icons 432, 436, 438, 440 and 460 are coded, by color for example, based on the document prototype that is instantiated to correspond to the respective nodes 206–214. For example, the icon 432 is colored blue as represented by the horizontal parallel lines; icon 438 is colored red as represented by the parallel vertical lines; and icon 440 is colored green as represented by the parallel slanted lines. As shown in the legend area 406, the blue color indicated in area 424 corresponds to a description document prototype; the green color indicated in area 426 corresponds to an argument prototype; and the red color indicated in area 428 corresponds to a narrative prototype.

The nodes of the goals outline 202 may be stored as node cards in the card database 106. The node cards include all the information associated with the corresponding nodes including the relationships with other goals outline nodes.

The author may instantiate a document prototype for any node 206–214 by simply selecting the node using the keyboard/mouse 609 and selecting a document prototype via a prototype browser shown in FIG. 9 to be discussed later. After instantiation, the instantiated document prototype may be linked to cards in the card database via the card link area 404. For example, FIG. 8 shows that node 214 is selected as indicated by the dotted box 434. When selected, information regarding the instantiated document prototype is displayed in the card link area 404. There are four columns in the card link area 404 as follows: 1) card number 410; 2) card name 412; 3) slot type 414; and 4) link type 416. Each of the entries 418–422 corresponds to a slot type 414 of the document prototype.

The slot types 414 of the description document prototype 304 corresponding to the selected node 214 are displayed in the card link area 404. As shown in FIG. 8, entry 418 indicates that the first card is labeled Evidence and corresponds to the slot type Background. As indicated by the link type "M", the Background slot type is required to be linked to a card. Entry 420 indicates that a second card named Folder A is linked to the slot type Constraint and that this is an optional link as indicated by the link type "O". Entry 422 indicates that the Nth card named Goals OL C is linked to a User slot type which is a User defined link type indicated by "U".

The author uses the display shown in FIG. 8 to explicitly link each of the slot types of the instantiated document prototype to a specific card, thus connecting information content of a card to a specific goals outline element. By using the goals outline display 400, an author generates the goals outline 202 and connects each element in the goals outline 202 with the hypermedia information in a logical structure.

Figure 9:
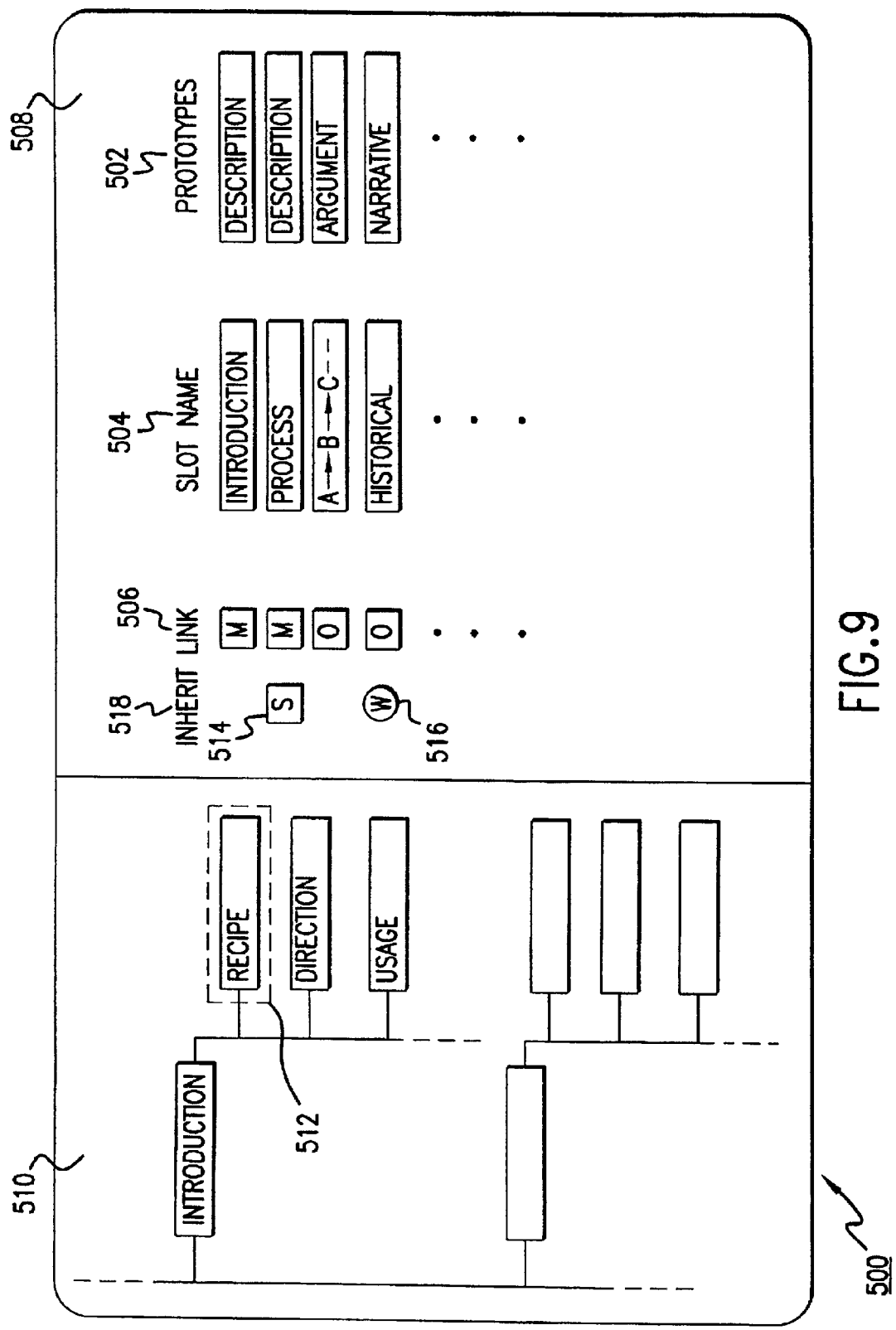
FIG. 9 illustrates an example of a browser for document prototypes.

FIG. 9 shows a browser display 500 that provides the author the ability to browse and select a document prototype for instantiation in the goals outline 102. The browser display 500 has a directory display area 510 and a prototype display area 508. In the directory display area 510, a directory of document prototypes contained in a database contained in the memory 604, for example, are displayed. If the author selects a prototype such as a recipe prototype 512, the slot types of the recipe prototype 512 are displayed in the prototype display area 508.

The prototype display area 508 includes four columns: prototypes 502, slot name 504, link 506 and inherit 518. The slot names corresponding to the selected document prototype are listed under the slot name column 504. For example, for the recipe document prototype 512 the slot names are Introduction, Process, A→B→C . . . , and Historical. Corresponding to each of the slot names, the prototype display area 508 suggests a document prototype for further expanding the subject matter of the corresponding slot type in greater detail. For example, the Description document prototype is suggested for further expansion of the Introduction and Process slot names. The Argument document prototype is suggested for further expanding the A→B→C . . . slot name and the Narrative document prototype is suggested for further expanding the Historical slot name.

The link column 506 indicates the type of links to cards that corresponds to the slot names. For example, links to cards corresponding to Introduction and Process slot names are mandatory while links to cards corresponding to A→B→C . . . and Historical slot names are optional links.

The inherit column 518 indicates whether the link type for each slot name is inherited from a higher level document prototype. Because document prototypes may be recursively defined (i.e., a document prototype being defined by other document prototypes), the link types of higher level document prototypes may either be applied to the lower level document prototypes such as indicated by the symbol 514 corresponding to the Process slot name or be overwritten by the lower level document prototype as indicate by the symbol 516 corresponding to the Historical slot name. Thus, the browser display 500 provides the author complete flexibility in defining document prototypes and when used in conjunction with the goals outline display 400 as shown in FIG. 8, and each of the instantiated document prototypes may be linked to a card in the card database 106.

Figure 10:
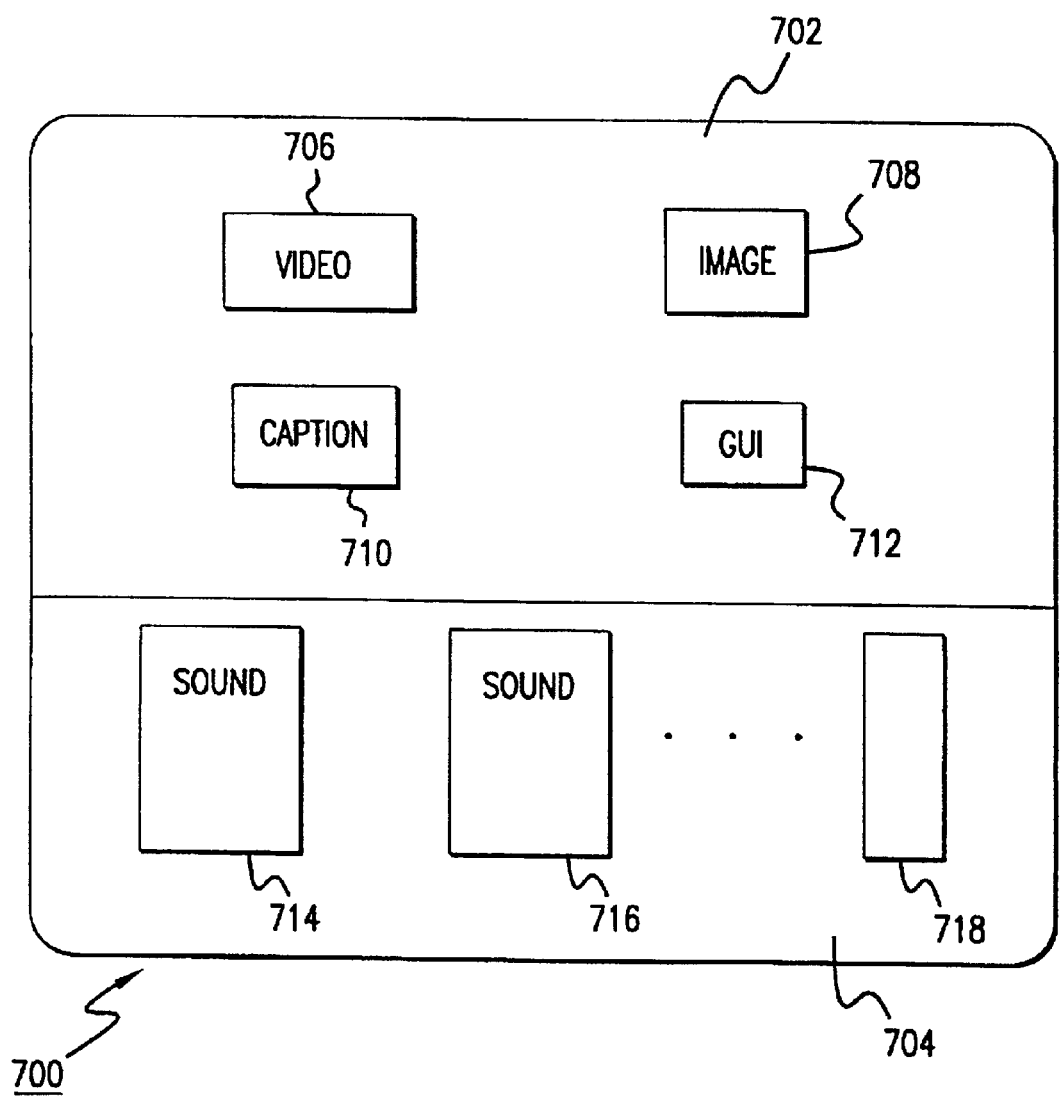
FIG. 10 illustrates an example of a layout workspace.

The presentation outline processor 610, as shown in FIG. 7, provides support for the author to generate a presentation outline 104 for the physical appearance of the document. FIG. 10 shows a layout workspace 700 where the author may generate a physical appearance of the document spatially as well as temporally by placing spacer objects in a spatial layout area 702 and spacer objects in a sound layout area 704. For example, the author may place visual spacer objects 706–712 and sound spacer objects 714, 716 and 718 as shown in FIG. 10.

Figure 11:
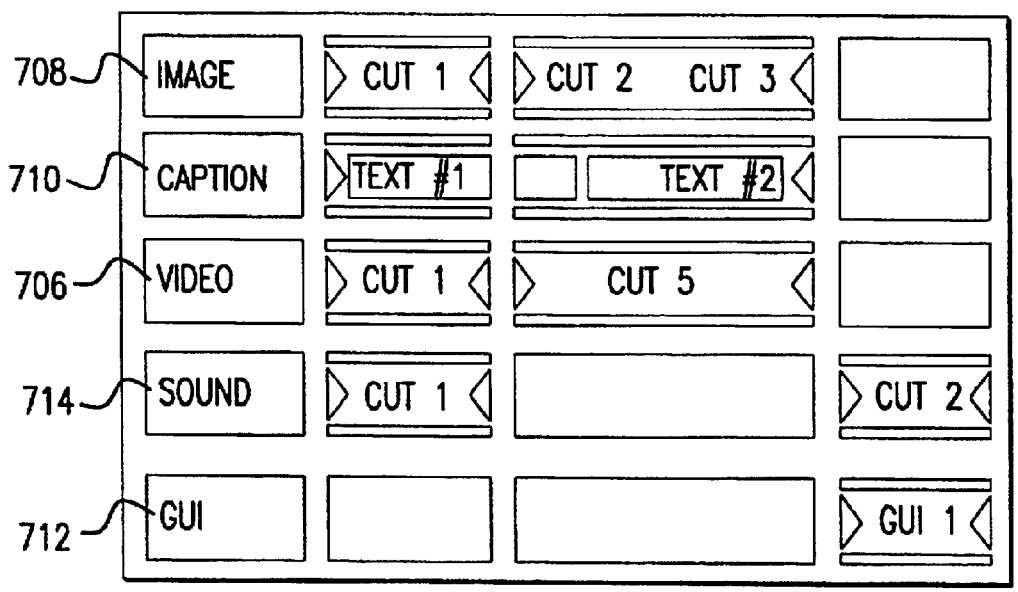
FIG. 11 is a temporal view of the layout workspace.
Figure 12:
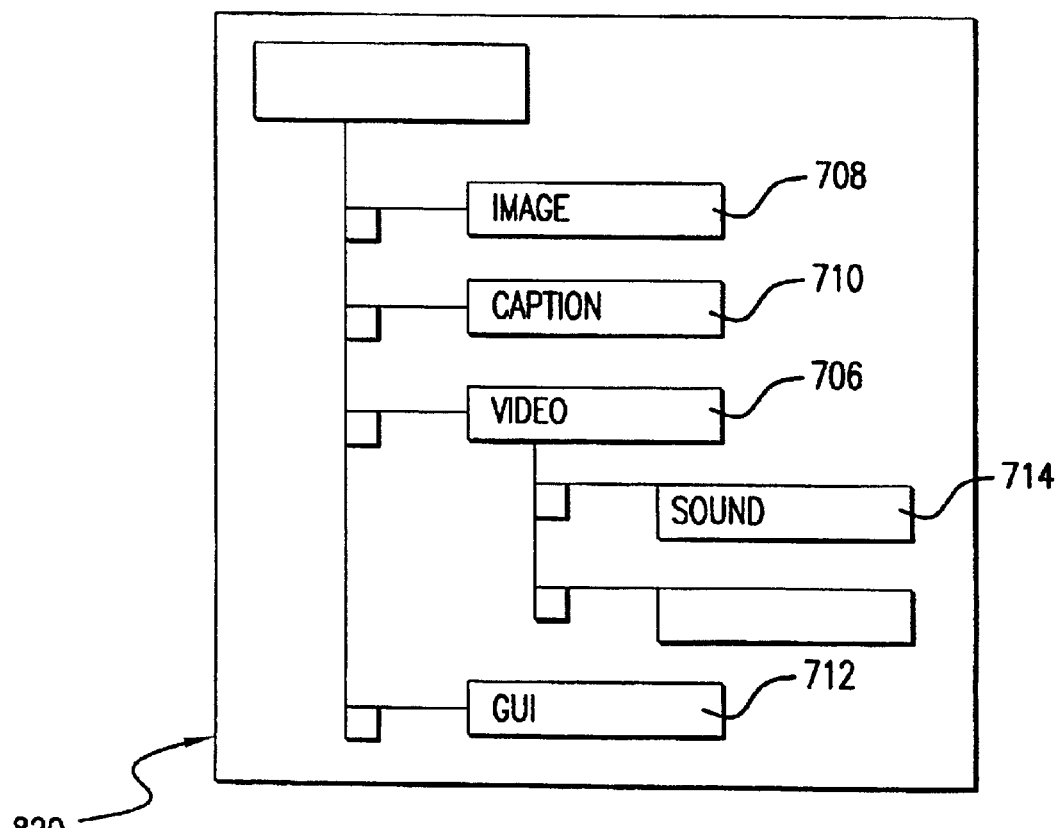
FIG. 12 is of a logical view of the layout workspace.

Each of the spacer objects may be time sequenced using a temporal view 810 of the layout workspace 700 as shown in FIG. 11. For example, image 708 may be temporally spaced by placing cut 1, cut 2 and cut 3 of the image 708 in the respective temporal positions. Similarly for the caption 710, video 706, sound 714 and Graphical User Interface (GUI) 712. In addition, the spacer objects may also be displayed in a logical format 820 as shown in FIG. 12.

Figure 13:
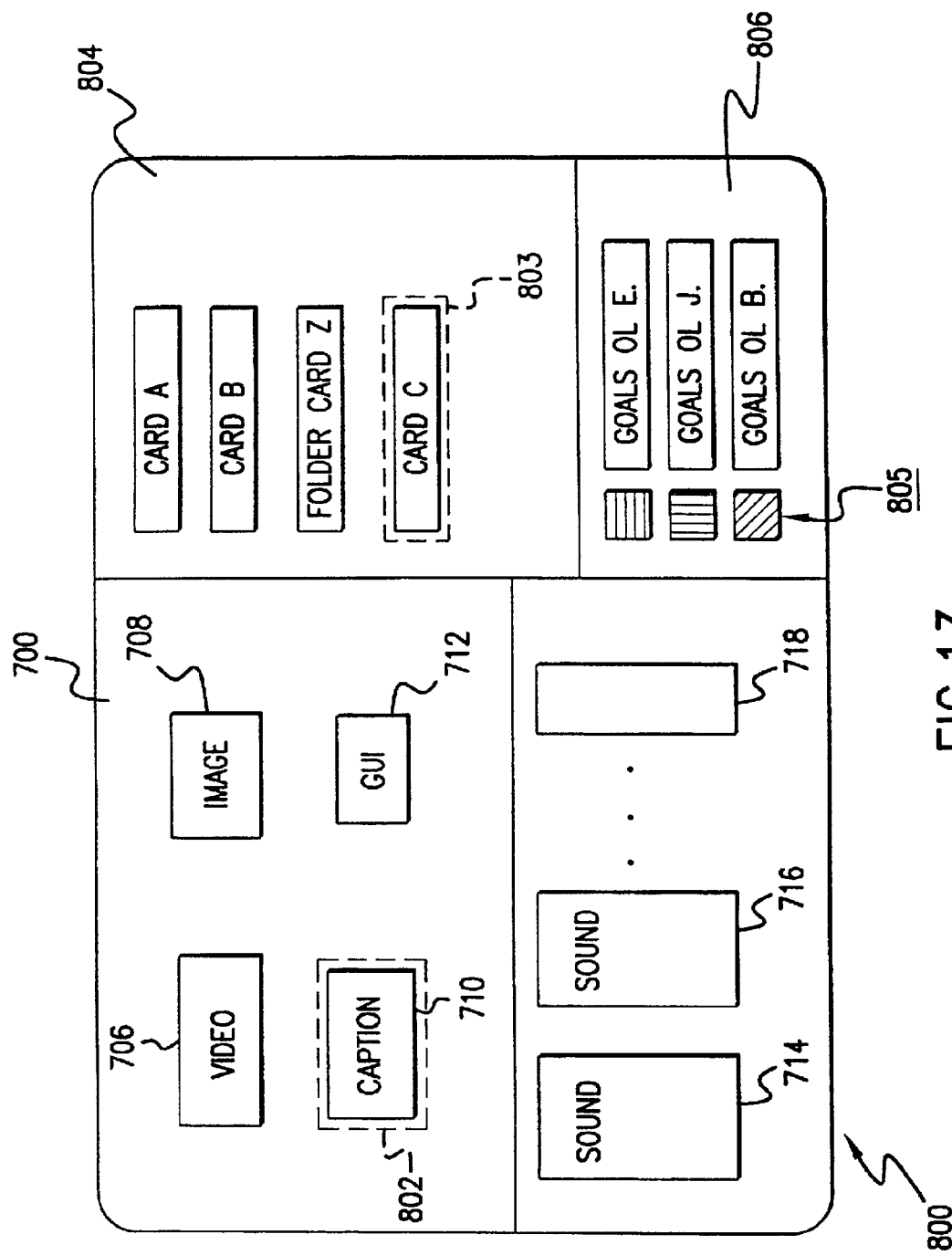
FIG. 13 illustrates a Bento-box.

The spacer objects 706–718 in the layout workspace 700 are linked to corresponding cards by using a Bento-box 800 (which may be a card) which include the layout workspace as shown in FIG. 13. A card link area 804 shows the cards that are linked to corresponding spacer objects 706–718. For example, the caption spacer object 710 is highlighted as indicated by the dotted box 802 and the corresponding card C is also highlighted as indicated by the dotted box 803. If a spacer object 706–718 is linked to more than one card, then all the cards linked to the selected spacer object are highlighted.

In addition to the card link area 804, the Bento-box 800 also includes a related goals outline area 806 that shows related goals outline nodes. The related goals outline nodes are goals outline nodes that are linked to cards which are also linked to spacer objects in the Bento-box 800. In addition, icons indicating the types of the related goals outline nodes are shown in the area 805. Thus, Goals OL E is a description type; Goals OL J is a narrative type; and Goals OL B is an argument type based on the legend shown in the legend area 406 of FIG. 8. The Bento-box 800 provides a method for linking the presentation outline to the cards in the card database 106 which indirectly also links the presentation outline 104 with the goals outline 102 as indicated by the related goals outline area 806.

Figure 14:
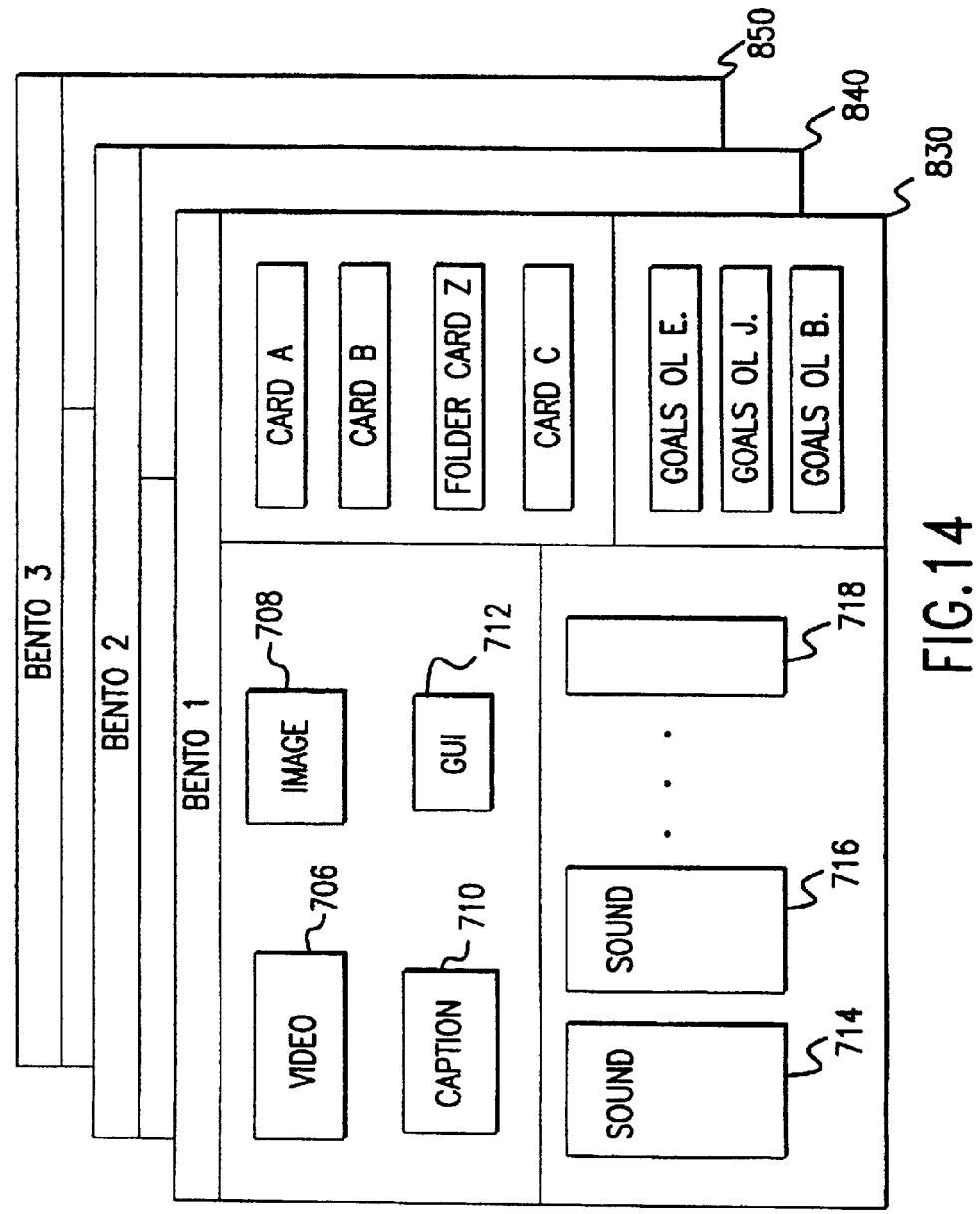
FIG. 14 illustrates a stack of Bento-boxes.
Figure 15:
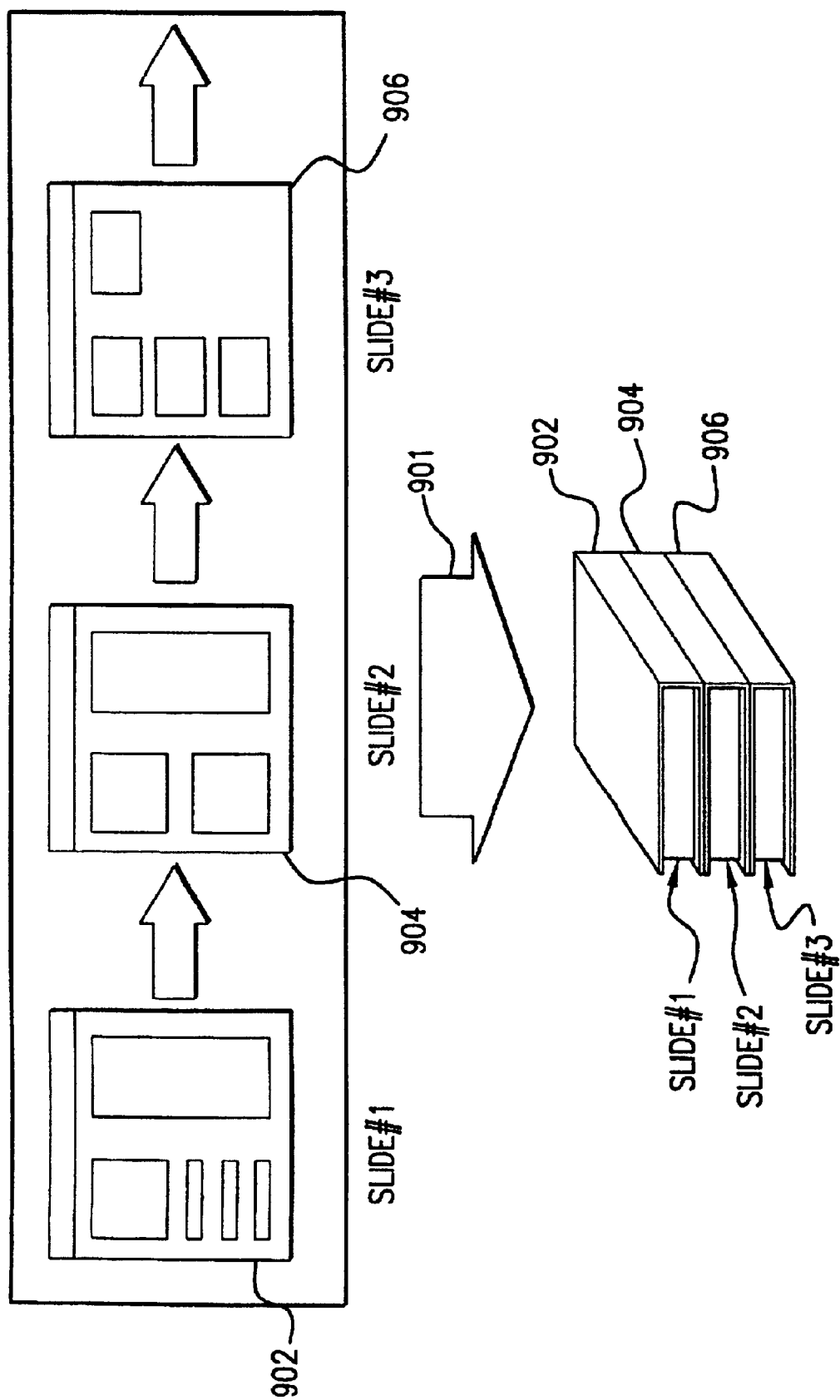
FIG. 15 illustrates an example of Bento-boxes for a slide sequence.

FIG. 14 shows a stack of Bento-boxes 830, 840 and 850. Bento-box 830 titled Bento 1 is displayed first and then Bento-box 840 titled Bento 2 is displayed second and then Bento-box 850 titled Bento 3 is displayed third. Thus, the Bento-boxes 830, 840 and 850 are linked to each other in a stack to indicate a serial presentation of the information contained in each of the Bento-boxes 830, 840 and 850. A Bento-box stack may be given titles so that each of the Bento-box stacks may be referenced as a whole when linked to other Bento-boxes or Bento-box stacks. For example, FIG. 15 shows such a sequence of Bento-boxes slide #1 902, slide #2 904 and slide #3 906. These Bento-boxes 902–906 are arranged sequentially in a stack so that Bento-boxes 902, 904 and 906 are presented in sequential order as a slide presentation.

Figure 16:
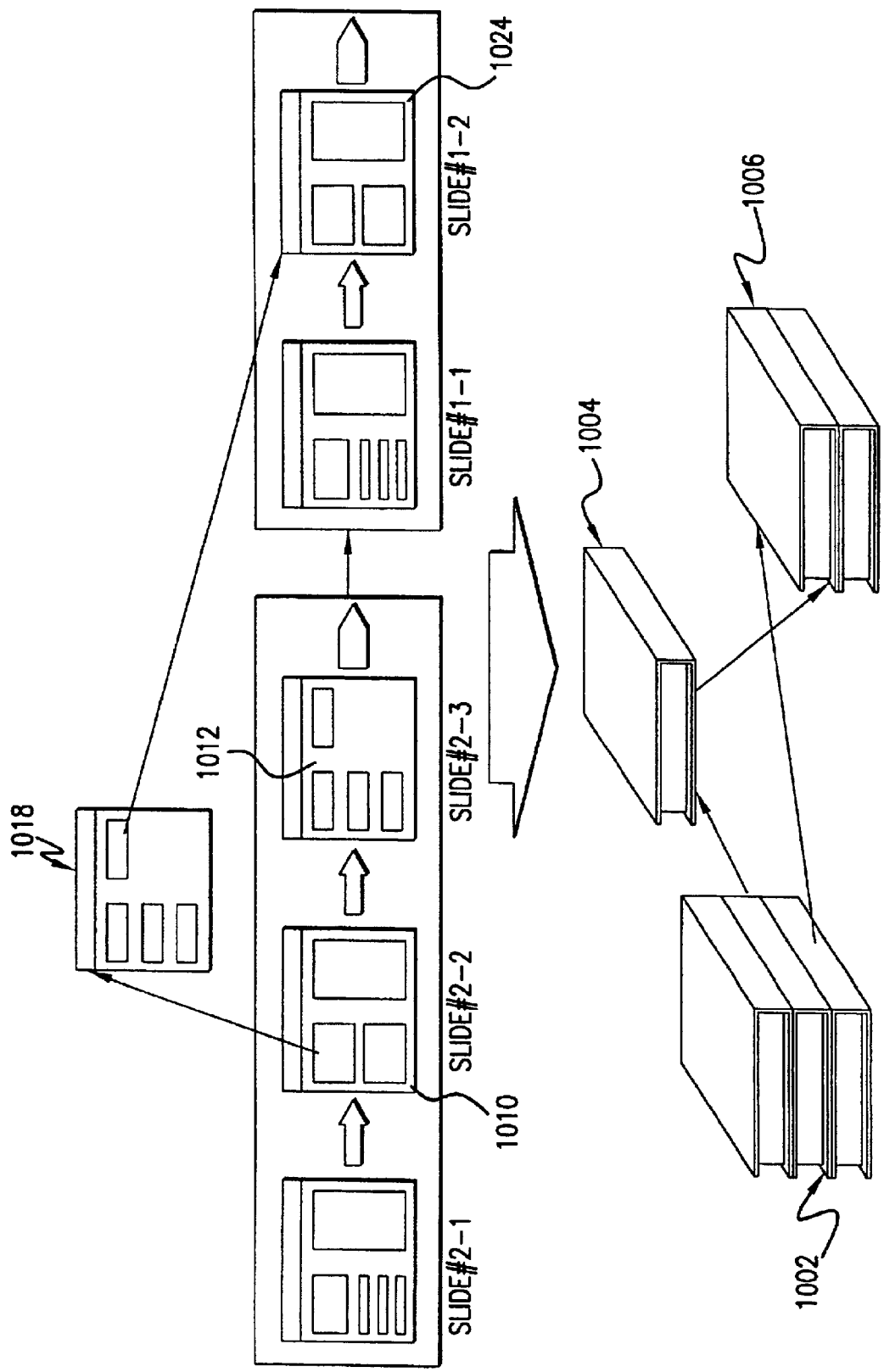
FIG. 16 illustrates hyperlinks in Bento-boxes.

Bento-boxes 800 and Bento-box stacks may also be linked in other manners such as shown in FIGS. 16. In FIG. 16, Bento-box 1010 is linked to Bento-box 1012 sequentially as described earlier but also a spacer object in the Bento-box 1010 may be hyperlinked to a Bento-box 1018 which in turn is hyperlinked to Bento-box 1024. Thus, when the Bento-box 1010 is being presented and the portion hyperlinked to Bento-box 1018 is encountered, the author or a reader of the authored document may select the hyperlink by using the keyboard/mouse 609 to begin presentation of the contents of Bento-box 1018. This process may continue from hyperlink to hyperlink to trace out a complete path established by the hyperlinks. Thus, as shown in the bottom of FIG. 16, Bento-box stacks 1002, 1004 and 1006 are hyperlinked to each other as indicated by the arrows.

Figure 17:
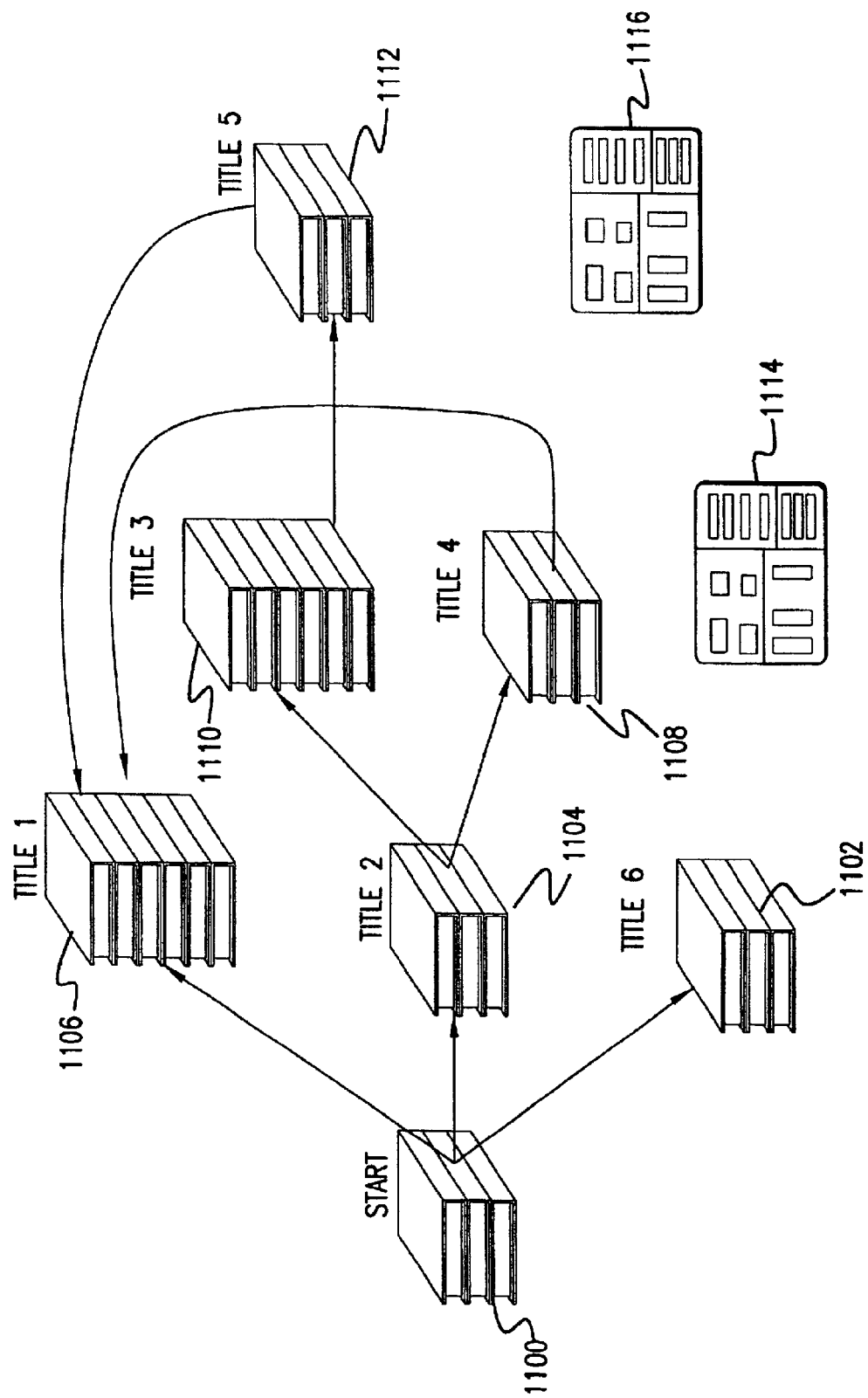
FIG. 17 illustrates an example of a document in terms of an overview of linked Bento-boxes.

Aside from the hyperlinks, Bento-boxes and Bento-box stacks may be linked as individual entities, as shown in FIG. 17. The Visualization processor 612 displays Bento-boxes 800, Bento-box stacks and the connecting links such as links and hyperlinks discussed above. FIG. 17 shows an example of a overview of all the Bento-boxes 1100–1116 in an authored document so that a comprehensive understanding may be obtained regarding the physical appearance of the document. Also, the overview shows unconnected Bento-boxes such as Bento-boxes 1114 and 1116.

Figure 18:
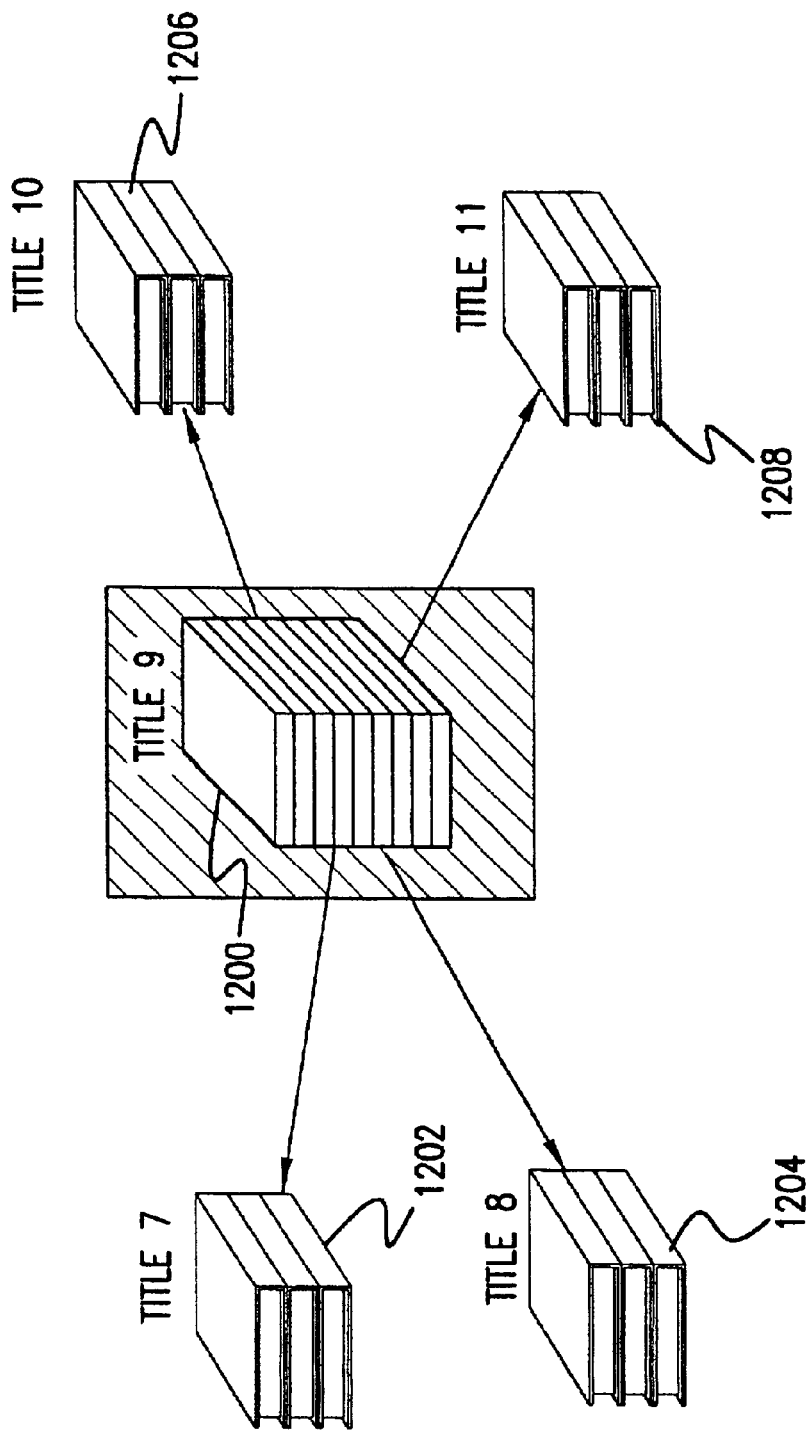
FIG. 18 illustrates a partial document in terms of Bento-boxes and links to and from Bento-boxes.

When a single Bento-box 800 or a Bento-box stack is selected, a partial view of the document is provided as shown in FIG. 18. In particular, FIG. 18 shows the links to and from the Bento-box 1200.

Figure 19:
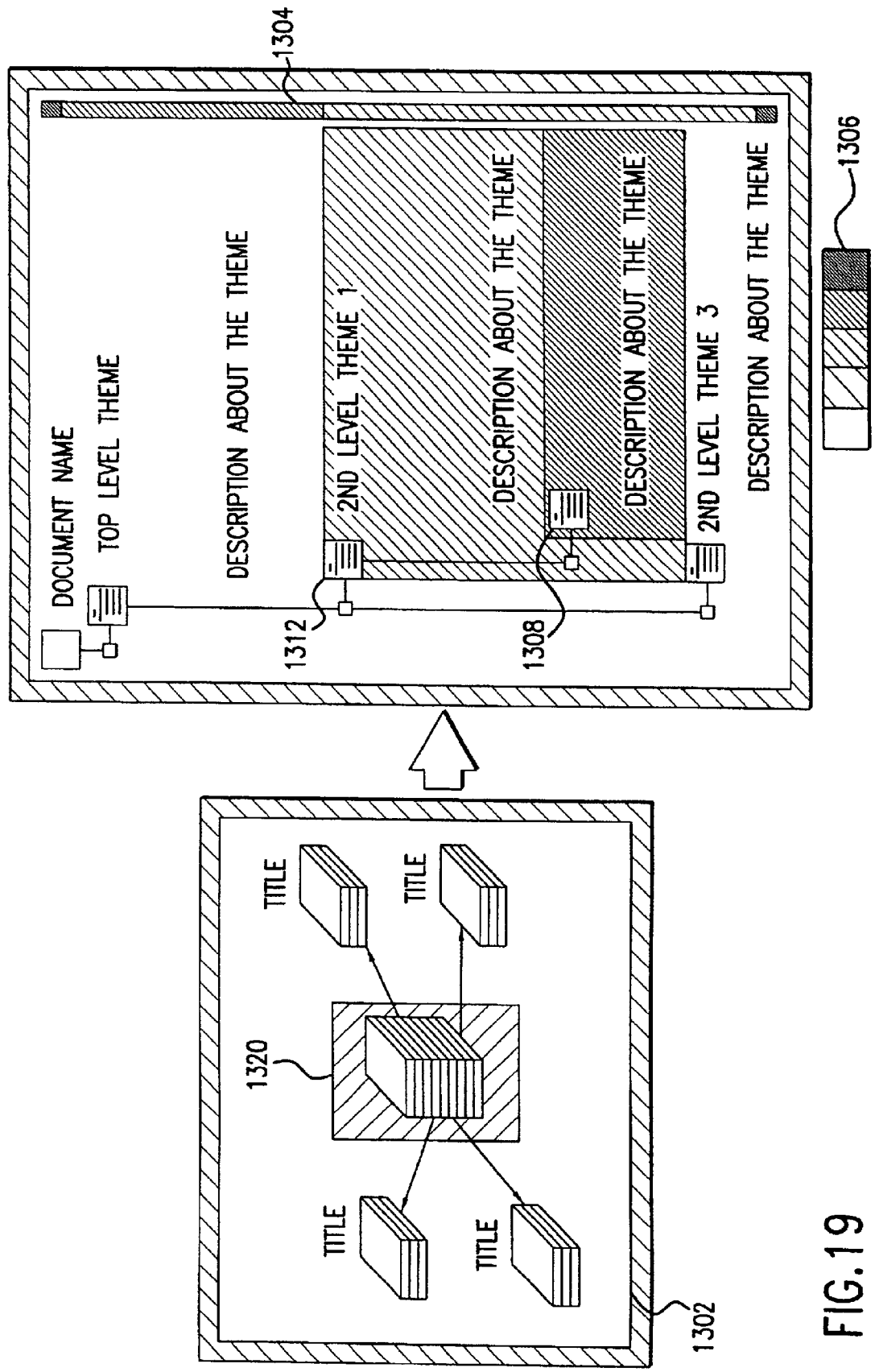
FIGS. 19 and 20 illustrate examples of a display of the goals outline and the presentation outline and the relationship between the outlines.
Figure 20:
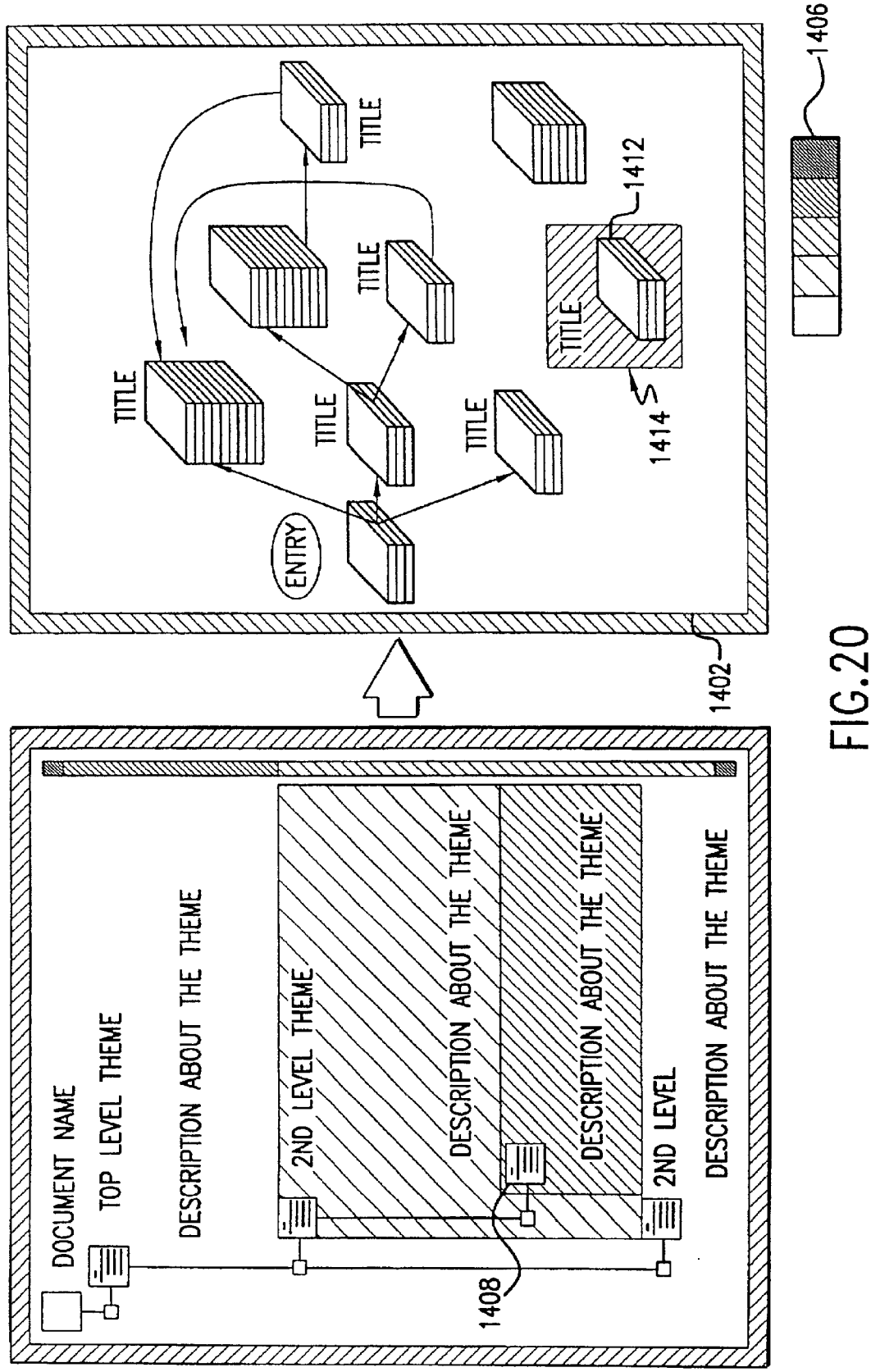

The visualization processor 612 also provides displays that show a relationship between the goals outline 102 and the presentation outline 104, as shown in FIGS. 19 and 20. FIG. 19 shows a Bento-box link display 1302 and a goals outline display 1304. The Bento-box link display 1302 indicates that Bento-box stack 1320 is selected. Thus, all the links from other Bento-boxes to and from the Bento-box 1302 are also shown.

When a Bento-box stack is selected such as Bento-box stack 1320, the nodes of the goals outline that are related to the selected Bento-box stack 1320 are highlighted based on a color code, for example. A legend 1306 for such a code may also be displayed as in FIG. 19. A relationship criteria may be defined by the author based on formulas such as a ratio of the number of cards assigned to the selected Bento-box stack or Bento-box divided by the total number of cards assigned to a single goals outline node. Thus, under this criteria and based on the legend 1306, node 1308 of the goals outline shown in FIG. 19 has a greater ratio than node 1312.

If all the Bento-boxes of the authored document are selected, then the display corresponding to FIG. 19 shows a completeness measure where the number of cards linked to the Bento-boxes are compared to the number of cards linked to the goals outline. Thus, the author is provided an assessment of the progress of the authoring process and the comprehensiveness of the relationship between the goals outline and the presentation outline. This feature provides the author with an indicator of how close the document authoring process is to completion.

FIG. 20 shows the converse of the situation shown in FIG. 19. In FIG. 20, a node of the goals outline 102 is selected such as goals outline node 1408, and the corresponding Bento-boxes 800 in the presentation outline is also highlighted, for example Bento-box 1412. A ratio may be calculated to relate the number of cards linked to the selected goals outline node in the highlighted corresponding Bento-boxes 1412. Thus, the progress of the document authoring process may be assessed and the relationship between the goals outline and the presentation outline may be obtained.

The resource appropriation processor 614 of the terminal 600 processes information received from sources external to the terminal 600. For example, if a new video clip is to be included as part of the document being authored, the resource appropriation processor 614 processes the video clip by either placing the complete video clip into a card or separating selected frames of the video clip and creating cards for each frame, for example. In addition, the soundtrack of the video clip may be also separated into a separate card and placed into the card database 106 together with the other created cards. During either goals outline generation or presentation outline generation, the author may link the new cards with a spacer object or a slot type corresponding to an instantiated document prototype.

If information to be imported into the terminal 600 are already structured as cards, then the resource appropriation processor simply imports the additional cards and stores the imported cards in the card database 106 so that the cards may be linked through either the goals outline 102 or the presentation outline 104.

The navigation processor 606 of the terminal 600 provides a navigation facility to assist the author with a familiar meta-level GUI such as a kitchen, an office or a studio, to navigate through the large amount of media data in relationship to the goals and presentation outlines 102 and 104.

Figure 21:
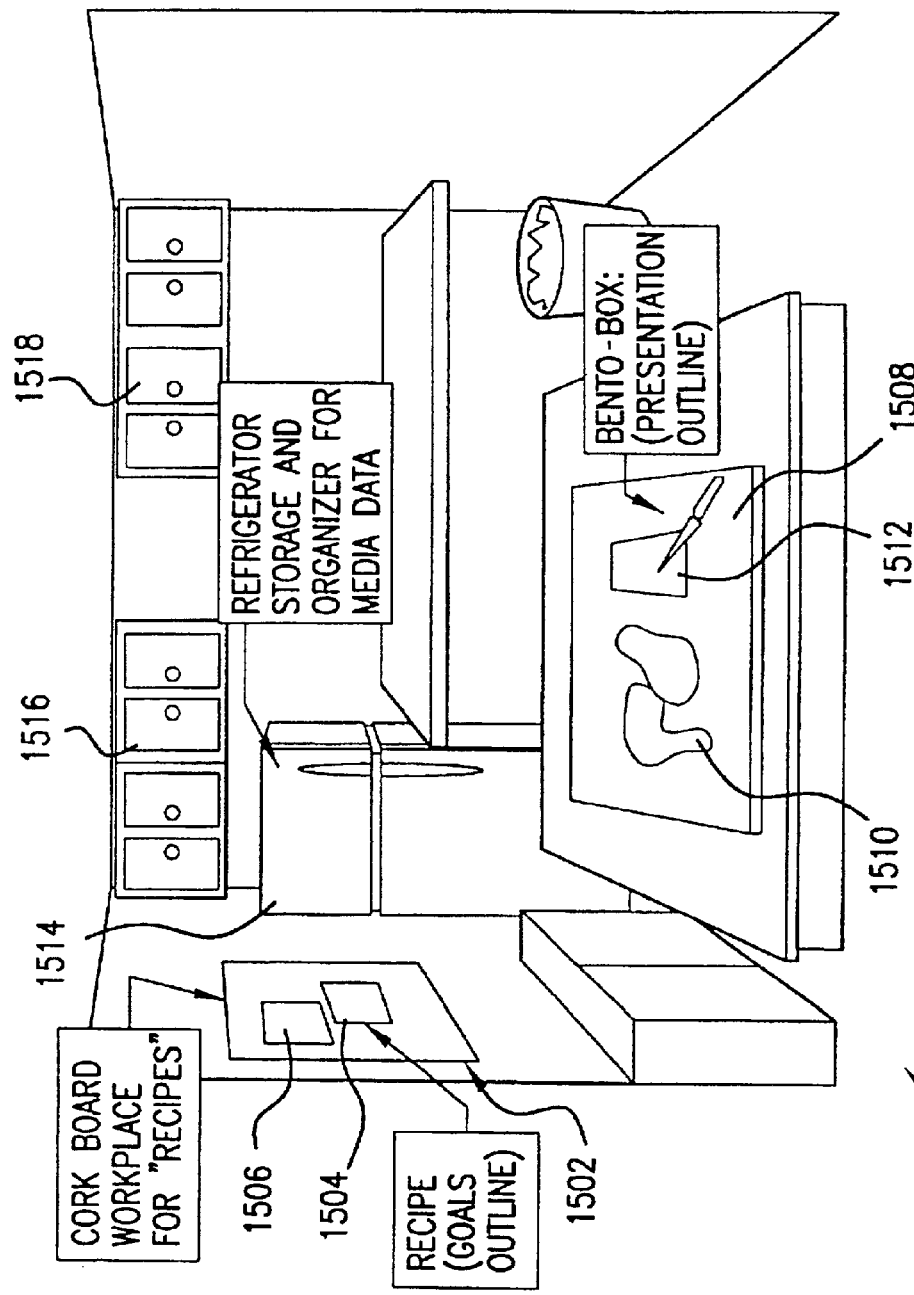
FIGS. 21–23 illustrate meta-level graphic user interfaces (GUI).

FIG. 21 shows a display of a kitchen 1500 as the meta-level GUI. The "Recipes" 1504 or 1506 on the corkboard 1502 displays the goals outline 102 (i.e. logical structures). The cutting board 1508 displays the presentation outline. The Bento-boxes 1510 and 1512 are shown on the cutting board 1508. In addition, the refrigerator 1514 and the cabinets 1516 and 1518 show other possible spaces and organizers for media data.

Figure 22:
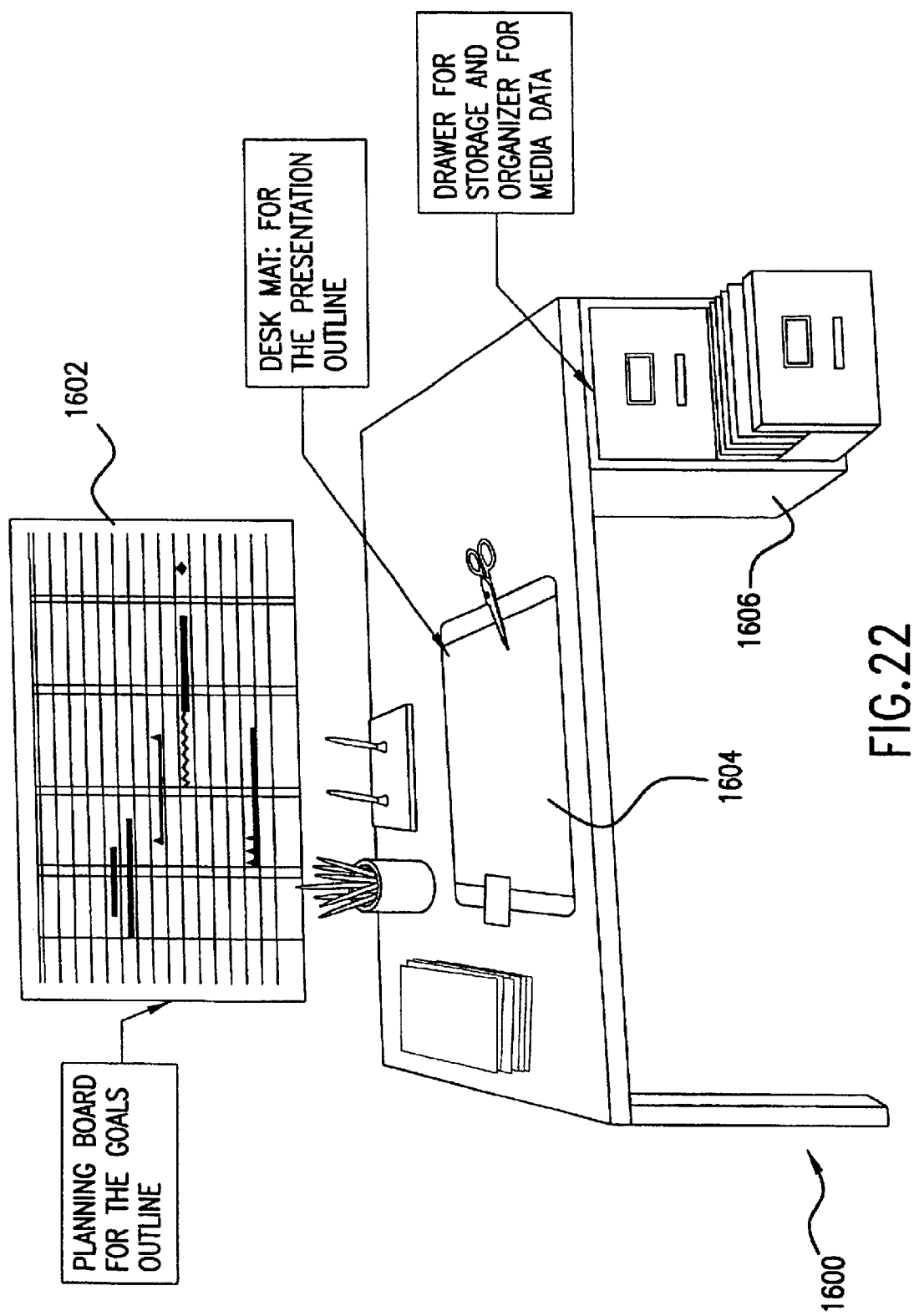

Similarly, FIG. 22 shows a display of an office 1600 as the meta-level GUI. The planning board 1602 displays the goals outline 102 and the desk mat 1604 displays the presentation outline 104. The filing cabinet 1606 stores and organizes the media data in the form of cards, for example.

Figure 23:
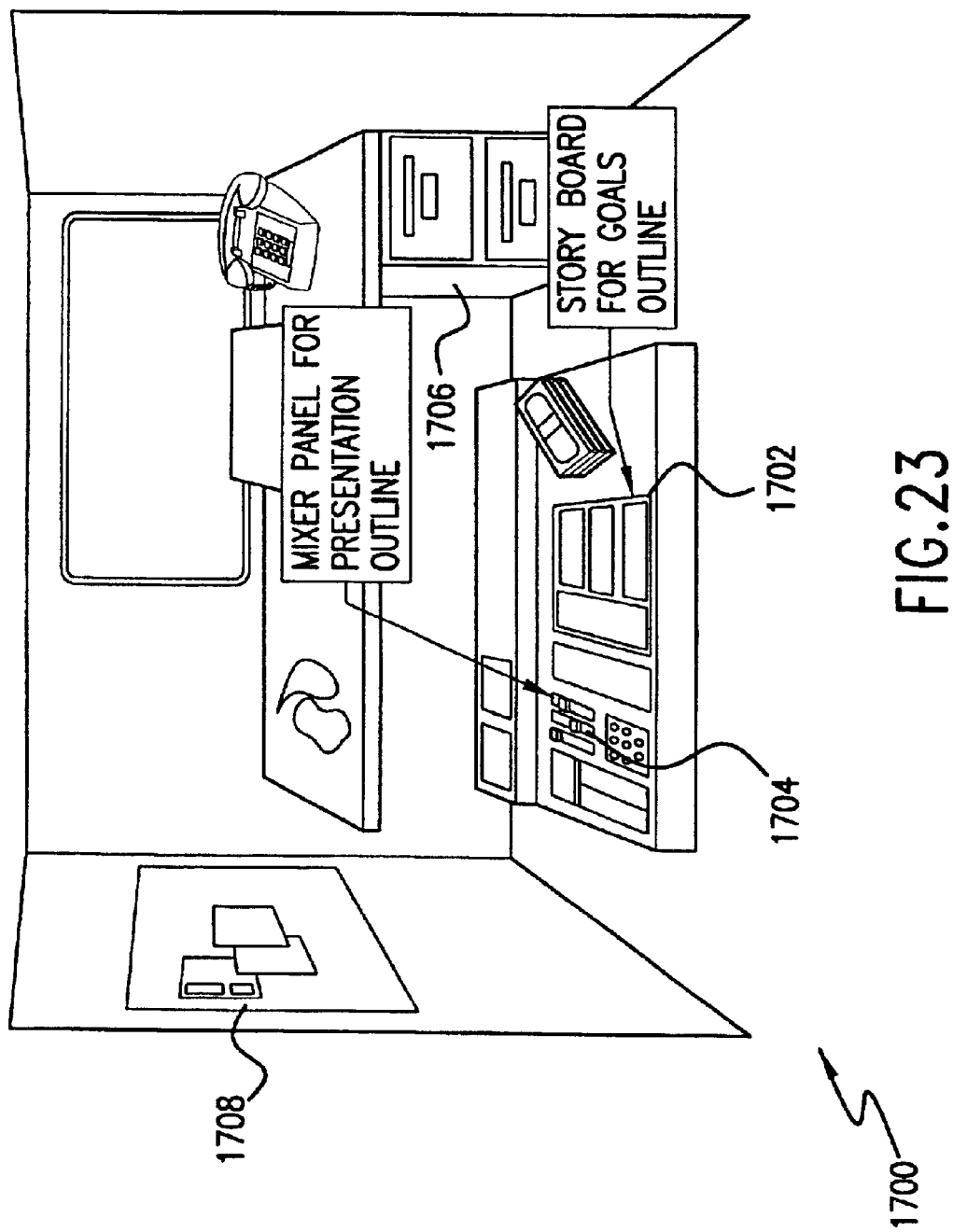

FIG. 23 shows a display of a studio 1700 as the meta-level GUI. The story board 1702 displays the goals outline 102, the mixer consoles 1704 displays the presentation outline 104. The file cabinet 1706 or the corkboard 1708 stores and organizes the media data.

While this invention has been described in conjunction with specific embodiments thereof, it is evident that many alternatives, modifications and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A document authoring device for a document which contains a goals outline and a presentation outline, comprising:

a user interface;

a memory;

a controller coupled to the user interface and the memory, wherein:

the controller links the goals outline and the presentation outline of the document together based on an input received through the user interface and data stored in the memory to at least partially author the document, the goals outline comprises organization of document information content and the presentation outline comprises appearance characteristics of the document, the user interface includes a display device, and the controller displays a goals outline display on the display device and generates the goals outline based on the input that relates to the goals outline display.

2. The device of claim 1, wherein the memory contains at least one document prototype, the controller generating a logical structure of the goals outline by instantiating the document prototype selected by the input.

3. The device of claim 2, wherein the memory contains a card, the controller linking the instantiated document prototype to the card selected by the input.

4. The device of claim 2, wherein the controller generates a card and links the card to the goals outline based on the input.

5. A method of authoring a document which contains a document goals outline and a document presentation outline, comprising:

storing data in memory;

receiving an input through a user interface;

displaying a goals outline display on a display device;

generating the document goals outline based on the inputs that relate to the goals outline display; and linking the document goals outline to the document presentation outline based on the input and the data to at least partially author the document, wherein the document goals outline comprises organization of document information content and the presentation outline comprises appearance characteristics.

6. The method of claim 5, further comprising:

generating a logical structure of the document goals outline by instantiating a document prototype selected by the inputs; and linking the instantiated document prototype to a card selected by the inputs.

7. The method of claim 6, further comprising:

generating a card; and linking the card to the document goals outline based on the inputs.

8. A method of authoring a document, comprising:

storing data in a memory;

receiving inputs through a user interface;

generating a goals outline by instantiating at least one of a description document prototype, an argument document prototype, an author generated prototype and a narrative document prototype to a selected node of the goals outline; linking the goals outline to a presentation outline based on the inputs and the data;

receiving external information;

generating at least one card based on the external information; and storing the at least one generated card as data in the memory, wherein at least one of the goals outline and the presentation outline is linked to the card wherein the presentation outline outlines at least one of an appearance characteristic and a sound characteristic of the document being authored using at least one spacer object in at least one of a spatial layout area and a temporal layout area.

9. The method of claim 8, wherein the step of generating a card comprises accepting the external information already in a desired card structure as the imported card.

10. The method of claim 8, wherein the step of generating a card comprises translating the external information into a desired card structure.

11. The method of claim 8, wherein the document prototype includes at least one predetermined slot type.

12. The method of claim 11, wherein the at least one predetermined slot type is linked to a corresponding card stored in the memory.

13. The method of claim 11, wherein the link to a corresponding card is classified as mandatory, optional and user defined.

14. The method of claim 8, wherein linking the goals outline to a presentation outline comprises linking at least one node of the goals outline to at least one of a node of the presentation outline and at least one card to which a node of the presentation outline is linked.

15. A method of authoring a document, comprising:

storing data in a memory;

receiving an input through a user interface;

generating a goals outline for the document being authored by instantiating a document prototype to a selected node of the goals outline;

generating a presentation outline which outlines at least one of an appearance characteristic and a sound characteristic of the document being authored using at least one spacer object in at least one of a spatial layout area and a temporal layout area;

linking the goals outline to the presentation outline based on the input and the data; and displaying on a display device a meta-level display of the goals outline and the presentation outline for the document being authored.

16. The method of claim 15, wherein the meta-level display is one of a kitchen image, an office image, and a studio image.

17. The method of claim 15, further comprising providing an assessment of at least one of a completeness and comprehensiveness of a relationship between the goals outline and the presentation outline.

18. The method of claim 15, wherein generating a goals outline comprises instantiating one of a description document prototype, an argument document prototype, an author generated prototype and a narrative document prototype to a selected node of the goals outline.

* * * * *